(12) United States Patent
Ventura Jaume et al.

(10) Patent No.: US 10,200,830 B2
(45) Date of Patent: Feb. 5, 2019

(54) METHOD FOR MANAGING FLOOR CONTROL ON A COMMUNICATION CHANNEL IN THE CONTEXT OF HALF-DUPLEX COMMUNICATIONS

(71) Applicant: Airbus Defence and Space SAS, Toulouse (FR)

(72) Inventors: Joan Ventura Jaume, Toulouse (FR); Laurent Franck, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 29 days.

(21) Appl. No.: 15/312,979

(22) PCT Filed: May 22, 2015

(86) PCT No.: PCT/EP2015/061426
§ 371 (c)(1),
(2) Date: Nov. 21, 2016

(87) PCT Pub. No.: WO2015/177350
PCT Pub. Date: Nov. 26, 2015

(65) Prior Publication Data
US 2017/0188205 A1 Jun. 29, 2017

(30) Foreign Application Priority Data
May 23, 2014 (FR) .................................... 14 54670

(51) Int. Cl.
*H04W 4/10* (2009.01)
*H04W 76/45* (2018.01)
(Continued)

(52) U.S. Cl.
CPC ................. *H04W 4/10* (2013.01); *H04L 5/14* (2013.01); *H04L 65/4038* (2013.01); *H04L 65/4061* (2013.01); *H04W 76/45* (2018.02)

(58) Field of Classification Search
CPC ...................................................... H04W 4/10
See application file for complete search history.

(56) References Cited

U.S. PATENT DOCUMENTS

| 7,684,818 B1 | 3/2010 | Gates et al. | |
| 2003/0235184 A1* | 12/2003 | Dorenbosch | ............ H04L 29/06 370/352 |

(Continued)

OTHER PUBLICATIONS

International Search Report, dated Jul. 14, 2015, priority PCT document.

*Primary Examiner* — Raj Jain
*Assistant Examiner* — Andrew C Lee
(74) *Attorney, Agent, or Firm* — Greer, Burns & Crain, Ltd.

(57) ABSTRACT

In the context of half-duplex communications in a communication network composed of a plurality of sub-networks associated respectively with supernode devices, a supernode device receiving a floor request: transmits a floor pre-grant message; determines a timer duration according to a distribution law $f_r(t)$ for time period between a floor release and the next floor control, and a network-latency distribution law $f_\delta(d)$, so that the probability of subsequent dismissing of the floor control is below a predefined threshold; and broadcasts the data transmitted in the context of the floor control, when the timer has elapsed. When a floor request with higher priority is detected before the expiration of the timer, the supernode device does not broadcast the data and notifies that the floor control is finally refused.

17 Claims, 7 Drawing Sheets

(51) Int. Cl.
*H04L 5/14* (2006.01)
*H04L 29/06* (2006.01)

(56) References Cited

U.S. PATENT DOCUMENTS

| | | | |
|---|---|---|---|
| 2004/0151138 A1* | 8/2004 | Paltemaa | H04L 29/06027 370/329 |
| 2006/0031294 A1* | 2/2006 | Poikselka | H04W 76/45 709/204 |
| 2006/0153102 A1* | 7/2006 | Kuure | H04Q 3/0016 370/263 |
| 2007/0266077 A1* | 11/2007 | Wengrovitz | H04M 3/42323 709/203 |
| 2010/0261494 A1 | 10/2010 | Tiwari et al. | |
| 2014/0219083 A1* | 8/2014 | Mandyam | H04L 65/4061 370/230 |
| 2015/0180963 A1* | 6/2015 | Luecke | H04L 67/06 709/203 |

* cited by examiner

METHOD FOR MANAGING FLOOR CONTROL ON A COMMUNICATION CHANNEL IN THE CONTEXT OF HALF-DUPLEX COMMUNICATIONS

CROSS-REFERENCES TO RELATED APPLICATIONS

This application claims the benefit of the French patent application No. 1454670 filed on May 23, 2014, the entire disclosures of which are incorporated herein by way of reference.

BACKGROUND OF THE INVENTION

The present invention relates to management of floor control on a shared communication channel in the context of half-duplex communications implemented in a communication network composed of a plurality of interconnected sub-networks.

PTT (Push-To-Talk) half-duplex communication systems are very widespread, in particular in the context of communications in professional environments involving safety services (police, fire and rescue), building and civil engineering companies and industry. Communication systems of PTT type implement a conversation method of half-duplex type on a shared communication channel, meaning that the communication passes in both directions, but not simultaneously. Communication systems of PTT type use MAC (medium access control) mechanisms at link layer allowing implementing conversations between users having terminal devices interconnected by a communication network, so that only one user speaks at a time, the other users then listening to the one who has taken the floor.

So as to ensure that only one communication device takes the floor on the shared communication channel, various mechanisms are known. A mechanism known as floor control is in particular known, implemented at application layer. Such a floor control mechanism is thus applicable to transmission of audio-data, but also to transmission of video data, or even audiovisual data or data of another type.

Such a floor control mechanism is based typically on the use of a server from which each terminal device shall request authorization before being able to take the floor. This server is then responsible for managing conflicts in floor requests, namely for managing the situations in which a plurality of terminal devices request competing respective floor controls.

In practice, a terminal device wishing to take the floor sends a floor request to the server. This wish to take the floor emanates typically from a user by pressing on a dedicated button of the terminal device. The server receives said request and selects the terminal device to which the floor is granted from potential competing requests that are sent thereto. The server sends a floor-granting confirmation message ("Floor Grant") to the terminal device that has been selected and a notification message representative of said floor-granting confirmation ("Floor Taken") to the other terminal devices, which then switch to listening to the terminal device to which the floor has been granted. The terminal device to which the floor has been granted can then take the floor and the other terminal devices are invited to await release of communication to send a floor request. When the terminal device to which floor control has been granted has ended the communication, said terminal device sends a floor releasing request ("Floor Release") to the server. The server then advises the other terminal devices that communication has been released, and that a new floor control can be implemented.

The communication network may be composed of a plurality of sub-networks interconnected by a communication link, e.g., a satellite link, involving high transmission latency between said sub-networks. This transmission latency is not insignificant in particular in view of the transmission latencies within the sub-networks. Because of this transmission latency, the server might then typically have to wait for long time periods after having received a floor request to determine whether one or more competing requests exist, in particular coming from a sub-network other than the one from which the floor request has been received. If the server does not wait for such time periods before deciding to which terminal device to grant the floor, the terminal devices closest to the server in terms of latency are favored and the floor control mechanism is unfair. The sub-networks may also involve very different transmission latencies.

It is then desirable, in these circumstances, to provide a solution that is fair whatever the location, in the communication network, of the terminal device issuing a floor request. It is also desirable to provide a solution that reduces the time for getting access to the floor, namely the period of time between the moment at which the terminal device requests the floor and the time at which said terminal device actually obtains floor grant, while limiting the risk of not complying with the chronology of actual attempts to take the floor (i.e., the risk that a user X who has chronologically attempted to speak before a user Y is heard by at least one other user Z after the user Y).

It is also desirable to provide a solution in which, when a terminal device has actually obtained floor grant, the data transmitted by said terminal device in the context of floor control are received substantially simultaneously by the terminal devices being listening.

It is also desirable to provide a solution that is simple to implement and at low cost.

SUMMARY OF THE INVENTION

The invention relates to a method for managing floor control on a shared communication channel in the context of half-duplex communications implemented in a communication network composed of a plurality of interconnected sub-networks, each sub-network being associated with a supernode device of the communication network, the method being implemented by one said supernode device. When a first floor request is received from a terminal device of the sub-network with which said supernode device is associated and said supernode device is not aware of at least one second floor request with higher priority, said supernode device performs the following steps: propagating the first floor request to each other supernode device; transmitting a floor pre-grant message to said terminal device so as to enable said terminal device to take the floor; transmitting a floor pre-grant notification message to each other terminal device in the sub-network with which said supernode device is associated, so that each said other terminal device listens to the shared communication channel; determining a timer duration according to a distribution law $f_r(t)$ for time period between floor release and a next floor request, and a distribution law $f_\delta(d)$ for network latency between an instant at which a floor request is transmitted by a terminal device and an instant at which said request is actually received by said supernode device, so that probability $P_{fail}$ of dismissing said terminal device of the floor control is below a first predefined threshold; storing in a buffer data received from said terminal device in the context of floor control, and propagating said data to each other supernode device; activating the buffer in read mode for broadcasting the stored data to each terminal device being listening on the sub-network associated with said supernode device, when said timer has elapsed. In addition, when the first floor request is received from a terminal device in a sub-network other than the one with which said supernode device is associated and said supernode device is not aware of at least one second floor request with higher priority, said supernode device performs the following steps: transmitting a floor pre-grant notification message to each terminal device in the sub-network with which the supernode device is associated, so that each terminal device in said sub-network listens to the shared communication channel; determining the duration of the timer according to the distribution law $f_\tau(t)$ and the distribution law $f_\delta(d)$, so that the probability $P_{fail}$ of dismissing said terminal device of the floor control is below the first predefined threshold; storing in the buffer data propagated by another supernode device in the context of floor control; activating the buffer in read mode for broadcasting the stored data to each terminal device being listening on the sub-network associated with said supernode device, when said timer has elapsed. Furthermore, when said supernode device detects at least one second floor request with higher priority before expiry of said timer, said supernode device releases the buffer and, when said first request has been received from a terminal device in the sub-network with which said supernode device is associated, said supernode device notifies said terminal device that said terminal device is refused floor control.

According to a particular embodiment, said supernode device transmits the floor pre-grant message after expiry of another timer of duration determined according to the distribution law $f_\tau(t)$ and the distribution law $f_\delta(d)$, so that the probability of dismissing said terminal device of the floor control is below a second predefined threshold strictly greater than said first threshold.

According to a particular embodiment, the distribution law $f_\tau(t)$ is defined by a model of log-normal type and expressed as follows:

$$f_\tau(t) = \frac{1}{t\sigma\sqrt{2\pi}} e^{-\frac{(\log(t)-\mu)^2}{2\sigma^2}}$$

where $\sigma$ represents standard deviation of the distribution law $f_\tau(t)$ and $\mu$ represents mean of the distribution law $f_\tau(t)$.

According to a particular embodiment, the distribution law $f_\delta(d)$ is defined by a model in the form of a mixture of three-parameter Weibull distribution laws and expressed as follows:

$$f_\delta(d) = \Sigma_i q_i f_{\delta_i}(d)$$

where i is an index on the components of the mixture and $q_i$ represents weighting coefficients such that:

$$\Sigma_i q_i = 1$$

and where:

$$f_{\delta_i}(d) = \frac{s_i}{r_i}\left(\frac{d-l_i}{r_i}\right)^{s_i-1} e^{-\left(\frac{d-l_i}{r_i}\right)^{s_i}} \text{ for } d \geq l_i$$

where $s_i$ is a shape parameter, $r_i$ a scale parameter and $l_i$ a location parameter.

According to a particular embodiment, the distribution laws $f_\tau(t)$ and $f_\delta(d)$ are predetermined by said supernode device according to long-term statistics previously collected along with message exchanges in the context of the half-duplex communications.

According to a particular embodiment, the probability $P_{fail}$ of dismissing said terminal device of the floor control is expressed as follows:

$$P_{fail} = 1 - \sum_{k=0}^{N-1} \binom{N-1}{k} P_{push}^k (1-P_{push})^{N-1-k} (1-P'_{fail})^k$$

where $P_{push}$ represents probability for a terminal device to request the floor control determined by said supernode device by counting the number of competing floor requests detected for each floor control granted, namely:

$$P_{push} = \left(\sum_{q=1}^{Q} \frac{R_q - 1}{N-1}\right) / Q$$

where $R_q$ represents a quantity of competing requests received for each floor control granted q with $R_q \geq 1$ and where Q represents a quantity of considered granted floor control;

and where:

$$P'_{fail} = \frac{Prob\{T_1 + d_1 + T_b < T_2 + d_2 \ \& \ T_1 > T_2\}}{Prob\{T_1 + d_1 < T_2 + d_2 \ \& \ T_1 > T_2\} + Prob\{T_1 + d_1 < T_2 + d_2 \ \& \ T_1 < T_2\}}$$

where: Prob{x} represents probability of an expression represented by x being satisfied and where $T_1$ represents an instant at which said first floor request has been transmitted, $T_2$ represents the instant at which a second floor request with higher priority has been transmitted, $d_1$ represents a transmission latency experienced by said first floor request in the communication network, $d_2$ represents a transmission latency experienced by said second floor request in the communication network, and $T_b$ represents the duration of the timer, the expiry of which triggers reading of said buffer.

According to a particular embodiment, each floor request includes information representing a time period elapsed between an instant at which a floor-release message has been received in the context of the last floor control by the terminal device that transmitted said floor request and the instant at which said terminal device transmitted said request.

According to a particular embodiment, said supernode device considers that one said second floor request has a timewise higher priority than said first floor request when the time period represented by said information included in said second floor request is shorter than said time period represented by said information included in said first floor request.

According to a particular embodiment, for determining the duration of said timer, the supernode device performs the following steps: determining a time period t elapsed between an instant at which a floor-release message was received in the context of the last floor control by the terminal device that transmitted said first floor request and the instant at which said terminal device transmitted said first floor request; determining a latency d experienced by said first floor request between the transmission of said first floor request by said terminal device and the reception of said first floor request by said supernode device; and determining the duration of said timer from a look-up table that supplies a timer duration according to a set of predefined pairs (t,d), the content of the look-up table being previously defined according to the distribution law $f_\tau(t)$ and the concerned distribution law $f_\delta(d)$ so that the probability $P_{fail}$ of dismissing a terminal device of the floor control is below the first predefined threshold.

According to a particular embodiment, for filling the look-up table, a device performs the following steps: determining parameters for representing the distribution law $f_\tau(t)$; determining parameters for representing the applicable distribution law $f_\delta(d)$; determining a quantity of terminal devices present in the communication system; defining minimum and maximum values of time period t between a floor release and the next floor control, and of network latency d between an instant at which a floor request is transmitted by a terminal device and an instant at which said request is actually received by said supernode device; defining a step between two successive values of time period t to be considered and a step between two successive values of network latency d to be considered, so as to define each pair (t,d) to be represented in the look-up table; defining an acceptable maximum value for the duration of the timer; defining the value of said first threshold; defining an acceptable error margin ε; determining, by bisection, according to the distribution laws $f_\tau(t)$ and $f_\delta(d)$, a timer duration for each pair (t,d) to be represented in the look-up table, so that the probability $P_{fail}$ of dismissing a terminal device of the floor control is at a distance from the predefined threshold less than said acceptable error margin ε and so that the timer duration is less than said acceptable maximum value.

According to a particular embodiment, when a floor-release message is received from said terminal device and said terminal device is on the sub-network with which said supernode device is associated, said supernode device performs the following steps: propagating said received floor-release message to each other supernode device; transmitting a floor-release notification message to each other terminal device in the sub-network with which the supernode device is associated, after the buffer has been emptied; and releasing the buffer; and, when a floor-release message is received from said terminal device and said terminal device is on a sub-network other than the one with which said supernode device is associated, said supernode performs the following steps: transmitting a floor-release notification message to each terminal device in the sub-network with which the supernode device is associated, after the buffer has been emptied; and releasing the buffer.

According to a particular embodiment, various configurations of the communication network being possible, said supernode device selects the distribution law $f_\tau(t)$ and the distribution law $f_\delta(d)$ from a predefined set of distribution laws, according to an actual configuration of the communication network.

The invention also relates to a method for managing floor control on a shared communication channel in the context of half-duplex communications implemented in a communication network composed of a plurality of interconnected sub-networks, each sub-network being associated with a supernode device in the communication network, the method being implemented by one said supernode device. When a first floor request is received from a terminal device of the sub-network with which said supernode device is associated and said supernode device is not aware of at least one second floor request with higher priority, said supernode device performs the following steps: propagating the first floor request to each other supernode device; transmitting a floor pre-grant message to said terminal device so as to enable said terminal device to take the floor; transmitting a floor pre-grant notification message to each other terminal device in the sub-network with which said supernode device is associated, so that each said other terminal device listens to the shared communication channel; determining a timer duration according to a distribution law $f_\tau(t)$ for time period between a floor release and a next floor control, and a distribution law $f_\delta(d)$ for network latency between an instant at which a floor request is transmitted by a terminal device and an instant at which said request is actually received by said supernode device, so that probability $P_{fail}$ of dismissing said terminal device of the floor control is below a predefined threshold; storing in a buffer data received from said terminal device in the context of floor control, and propagating said data to each other supernode device; and activating the buffer in read mode for broadcasting the stored data to each terminal device being listening on the sub-network associated with said supernode device, when said timer has elapsed. In addition, when said supernode device detects at least one second floor request with a higher priority before expiry of said timer, said supernode device performs the following steps: releasing the buffer; and notifying said terminal device that said terminal device is refused floor control.

The invention also relates to a method for managing floor control on a shared communication channel in the context of half-duplex communications implemented in a communication network composed of a plurality of interconnected sub-networks, each sub-network being associated with a supernode device in the communication network, the method being implemented by one said supernode device. When a first floor request is received from a terminal device in a sub-network other than the one with which said supernode device is associated and said supernode device is not aware of at least one second floor request with higher priority, said supernode device performs the following steps: transmitting a floor pre-grant notification message to each terminal device in the sub-network with which the supernode device is associated, so that each terminal device in said sub-network listens to the shared communication channel; determining the duration of the timer according to a distribution law $f_\tau(t)$ for time period between a floor release and the next floor control, and a distribution law $f_\delta(d)$ for network latency between an instant at which a floor request is transmitted by a terminal device and an instant at which said request is actually received by said supernode device, so that probability $P_{fail}$ of dismissing said terminal device of the floor control is below a predefined threshold; storing in a buffer data propagated by another supernode device in the context of floor control; activating the buffer in read mode for broadcasting the stored data to each terminal device being listening on the sub-network associated with said supernode device, when said timer has elapsed. Furthermore, when said supernode device detects at least one second floor request with higher priority before expiry of said timer, said supernode device releases the buffer.

The invention also relates to a supernode device intended for managing floor control on a shared communication channel in the context of half-duplex communications implemented in a communication network composed of a plurality of interconnected sub-networks, each sub-network being associated with a supernode device in the communication network. Said supernode device is such that, when a first floor request is received from a terminal device in the sub-network with which said supernode device is associated and said supernode device is not aware of at least one second floor request with higher priority, said supernode device includes: means for propagating the first floor request to each other supernode device; means for transmitting a floor pre-grant message to said terminal device so as to enable said terminal device to take the floor; means for transmitting a floor pre-grant notification message to each other terminal device in the sub-network with which said supernode device is associated, so that each said other terminal device listens to the shared communication channel; means for determining a timer duration according to a distribution law $f_\tau(t)$ for time period between a floor release and a next floor control, and a distribution law $f_\delta(d)$ for network latency between an instant at which a floor request is transmitted by a terminal device and an instant at which said request is actually received by said supernode device, so that probability $P_{fail}$ of dismissing said terminal device of the floor control is below a first predefined threshold; means for storing in a buffer data received from said terminal device in the context of floor control, and for propagating said data to each other supernode device; means for activating the buffer in read mode for broadcasting the stored data to each terminal device being listening on the sub-network associated with said supernode device, when said timer has elapsed. In addition, when the first floor request is received from a terminal device in a sub-network other than the one with which said supernode device is associated and said supernode device is not aware of at least one second floor request with higher priority, said supernode device includes: means for transmitting a floor pre-grant notification message to each terminal device in the sub-network with which the supernode device is associated, so that each terminal device in said sub-network listens to the shared communication channel; means for determining the duration of the timer according to the distribution law $f_\tau(t)$ and the distribution law $f_\delta(d)$, so that the probability $P_{fail}$ of dismissing said terminal device of the floor control is below the first predefined threshold; means for storing in the buffer data propagated by another supernode device in the context of floor control; means for activating the buffer in read mode for broadcasting the stored data to each terminal device being listening on the sub-network associated with said supernode device, when said timer has elapsed. Furthermore, when said supernode device detects at least one second floor request with higher priority before expiry of said timer, said supernode device includes means for releasing the buffer and, when said first request has been received from a terminal device in the sub-network with which said supernode device is associated, said supernode device includes means for notifying said terminal device that said terminal device is refused floor control.

The invention also relates to a supernode device intended for managing floor control on a shared communication channel in the context of half-duplex communications implemented in a communication network composed of a plurality of interconnected sub-networks, each sub-network being associated with a supernode device in the communication network. When a first floor request is received from a terminal device in the sub-network with which said supernode device is associated and said supernode device is not aware of at least one second floor request with higher priority, said supernode device includes: means for propagating the first floor request to each other supernode device; means for transmitting a floor pre-grant message to said terminal device so as to enable said terminal device to take the floor; means for transmitting a floor pre-grant notification message to each other terminal device in the sub-network with which the supernode device is associated, so that each terminal device in said sub-network listens to the shared communication channel; means for determining a duration of the timer according to a distribution law $f_\tau(t)$ for time period between a floor release and the next floor control, and a distribution law $f_\delta(d)$ for network latency between an instant at which a floor request is transmitted by a terminal device and an instant at which said request is actually received by said supernode device, so that probability $P_{fail}$ of dismissing said terminal device of the floor control is below a predefined threshold; means for storing in a buffer data received from said terminal device in the context of floor control, and propagating said data to each other supernode device; and means for activating the buffer in read mode for broadcasting the stored data to each terminal device being listening on the sub-network associated with said supernode device, when said timer has elapsed. Furthermore, when said supernode device detects at least one second floor request with higher priority before expiry of said timer, said supernode device includes: means for releasing the buffer; and means for notifying said terminal device that said terminal device is refused floor control.

The invention also relates to a supernode device intended for managing floor control on a shared communication channel in the context of half-duplex communications implemented in a communication network composed of a plurality of interconnected sub-networks, each sub-network being associated with a supernode device in the communication network. When a first floor request is received from a terminal device in a sub-network other than the one with which said supernode device is associated and said supernode device is not aware of at least one second floor request with higher priority, said supernode device includes: means for transmitting a floor pre-grant notification message to each other terminal device in the sub-network with which said supernode device is associated, so that each other terminal device in said sub-network listens to the shared communication channel; means for determining the duration of the timer according to a distribution law $f_\tau(t)$ for time period between a floor release and the next floor control, and a distribution law $f_\delta(d)$ for network latency between an instant at which a floor request is transmitted by a terminal device and an instant at which said request is actually received by said supernode device, so that probability $P_{fail}$ of dismissing said terminal device of the floor control is below a predefined threshold; means for storing in a buffer data propagated by another supernode device in the context of floor control; means for activating the buffer in read mode for broadcasting the stored data to each terminal device being listening on the sub-network associated with said supernode device, when said timer has elapsed. In addition, when said supernode device detects at least one second floor request with higher priority before expiry of said timer, said supernode device includes means for releasing the buffer.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION OF THE PREFERRED EMBODIMENTS

Figure 1:
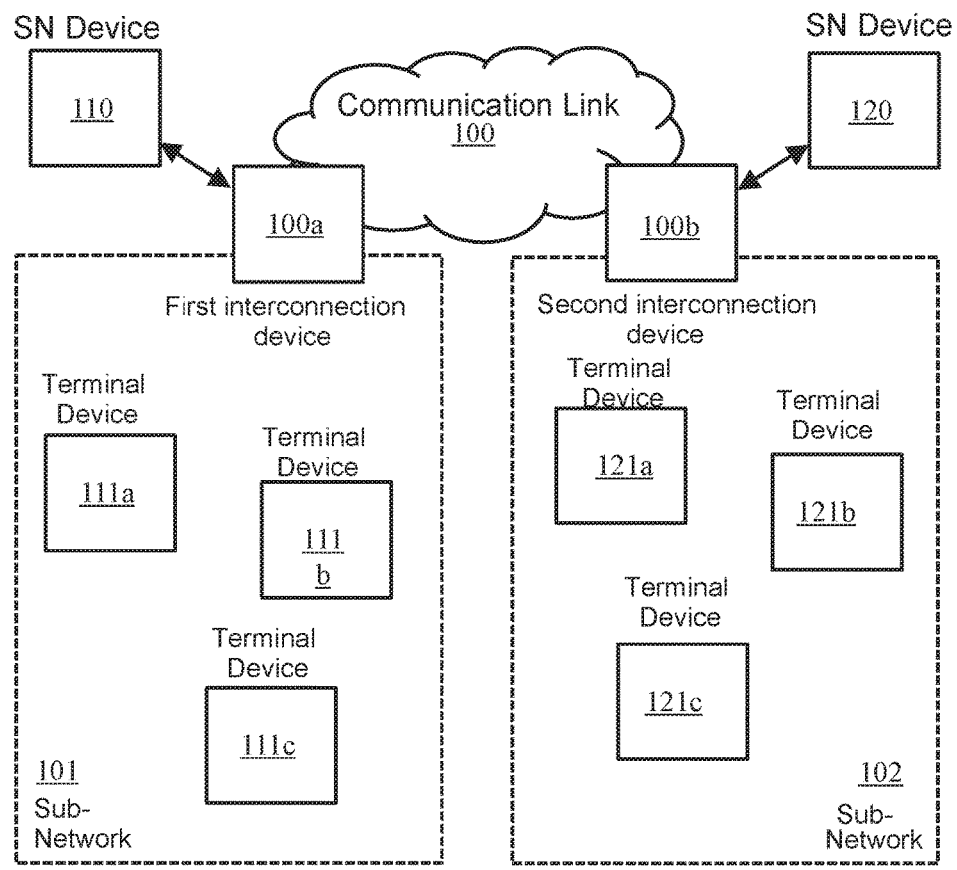
FIG. 1 schematically illustrates a communication system in which the present invention may be implemented.

To allow reducing the time for getting access to the floor on a communication channel in a communication network, it is proposed to arrange the communication network in interconnected sub-networks and to implement per sub-network one device, referred to as supernode SN. A sub-network is a subset of the communication network, a same sub-network being able to implement various communication technologies and thus form a hybrid sub-network.

Since the sub-networks are interconnected, the SN devices in the communication network are then able to communicate with each other thanks to the interconnections between the sub-networks. The communication network comprises a plurality of terminal devices that are able to share a communication channel, each sub-network comprising at least one such terminal device. The SN devices coordinate with each other in order to manage floor control on the shared communication channel and thus serve as relays between the terminal devices. It is then proposed that an SN device receiving a floor request from a terminal device in the sub-network with which said SN device is associated should transmit an early floor control authorization, referred to as floor pre-grant. Following such floor pre-grant, said terminal device transmits data in the context of floor control; these data are stored by the SN device in a buffer before being broadcast to terminal devices in said sub-network that are listening. When said SN device receives said data, said SN device also propagates said data to the other SN devices in the communication network, which also implement temporary buffering. This temporary buffering involves an awaiting, at each SN device, of the broadcasting of said data during a time period that is determined by each SN device according to a distribution law for time period between floor release and a next floor control (i.e., the floor control that follows said floor release in sequence) and a distribution law for network latency between an instant at which a floor request is transmitted by a terminal device and an instant at which said request is actually received by said SN device. The awaiting of the data in the buffer is managed by a timer that, once elapsed, triggers reading of said buffer to allow the actual transmission of said data to said terminal devices being listening. This approach allows shortening the time for getting access to the floor independently of the location in the communication network of the terminal device requesting the floor, while ensuring that the risk that a terminal device to which the floor has been granted being dismissed is statistically below a predefined threshold and while ensuring floor control chronology as well as possible. It is said that a terminal device is dismissed when the floor control is ended by said terminal device without this being the intention of said terminal device, whereas floor control by said terminal had been confirmed.

Thus the duration of the data awaiting in the buffer before being broadcast to the terminal devices being listening aims to maintain the probability of dismissing a terminal device below a predefined threshold. A case of error occurs therefore when a floor request is received after expiry of the timer triggering the reading of the buffer associated with another floor request that should have had a timewise lower priority, namely when:

$$T_1+d_1+T_b<T_2+d_2 \ \& \ T_1>T_2$$

where $T_1$ represents the instant at which the floor request that should have had a lower priority was transmitted, $T_2$ represents the instant at which the other floor request was transmitted, $d_1$ represents a transmission latency experienced in the communication network by the floor request that should have had a lower priority, $d_2$ represents a transmission latency experienced in the communication network by the other floor request, and $T_b$ represents the duration of the timer the expiry of which triggers the reading of the buffer associated with the floor request that should have had a lower priority.

The probability that such an error occurs can then be expressed as follows:

$$P_{fail} = \frac{Prob\{T_1+d_1+T_b<T_2+d_2 \ \& \ T_1>T_2\}}{Prob\{T_1+d_1<T_2+d_2 \ \& \ T_1>T_2\}+Prob\{T_1+d_1<T_2+d_2 \ \& \ T_1<T_2\}}$$

where: $Prob\{x\}$ represents the probability that an expression represented by x is satisfied, and where:

$$Prob\{T_1+d_1+T_b<T_2+d_2 \ \& \ T_1>T_2\}=\int_0^{T_1}\int_{T_1+d_1+T_b-t}^{+\infty}f_\tau(t)f_\delta(d)dddt$$

$$Prob\{T_1+d_1<T_2+d_2 \ \& \ T_1>T_2\}=\int_0^{T_1}\int_{T_1+d_1-t}^{+\infty}f_\tau(t)f_\delta(d)dddt$$

$$Prob\{T_1+d_1+T_b<T_2+d_2 \ \& \ T_1>T_2\}=\int_{T_1}^{+\infty}\int_{T_1+d_1-t}^{+\infty}f_\tau(t)f_\delta(d)dddt$$

with $f_\tau(t)$ a distribution law for time period t between a floor release and a next floor control and $f_\delta(d)$ a distribution law for network latency d between an instant at which a floor request is transmitted by a terminal device and an instant at which said request is actually received by a considered SN device.

In the end, according to a first embodiment, considering two competing floor requests, the probability $P_{fail}$ that such an error occurs is expressed as follows:

$$P_{fail} = P'_{fail}$$

According to a second embodiment, considering that all the terminal devices may seek to take the floor in competition, the probability $P_{fail}$ that such an error occurs is expressed as follows:

$$P_{fail} = 1 - (1 - P'_{fail})^{N-1}$$

where N represents the quantity of terminal devices present in the communication network.

According to a third embodiment, considering that not all the terminal devices seek to take the floor in competition, the probability $P_{fail}$ that such an error occurs is expressed as follows:

$$P_{fail} = 1 - \Sigma_{k=0}^{N-1} \binom{N-1}{k} P_{push}^k (1 - P_{push})^{N-1-k} (1 - P'_{fail})^k$$

where $P_{push}$ represents the probability that a terminal device requests the floor. The probability $P_{push}$ may be determined by each SN device by counting a quantity of competing floor requests detected for each floor grant, meaning.

$$P_{push} = \left( \sum_{q=1}^{Q} \frac{R_q - 1}{N - 1} \right) / Q$$

where $R_q$ represents the quantity of competing requests received for each floor grant q ($R_q \geq 1$) and where Q represents a quantity of considered floor grant.

Thus, thanks to these distribution laws $f_r(t)$ and $f_\delta(d)$, it is possible to determine a timer duration $T_b$ enabling to statistically ensure that the probability $P_{fail}$ of a floor request that should have had a higher priority being received after expiry of the timer duration $T_b$ is less than or equal to a predefined threshold $P_{target}$.

The approach proposed also enables making the timer for reading the SN device's buffer implemented in the context of a floor control expire substantially simultaneously, thus offering the possibility to all users being listening to hear the communication at the same time.

FIG. 1 schematically illustrates a communication system in which the present invention may be implemented.

The communication system comprises a first interconnection device 100a and a second interconnection device 100b. The first 100a and second 100b interconnection devices are interconnected by a communication link 100. The communication link 100 may be a physical link or a logical link. The communication link 100 may form part of a communication network, such as the Internet. The communication link 100 may be a terrestrial communication link or a satellite communication link.

The first interconnection device 100a is responsible for connecting a first sub-network 101 to the communication link 100, and the second interconnection device 100b is responsible for connecting a second sub-network 102 to the communication link 100. Once interconnected by the communication link 100, the first 101 and second 102 sub-networks thus form a communication network, so that one or more terminal devices 111a, 111b, 111c in the first sub-network 101 can indirectly communicate with one or more terminal devices 121a, 121b, 121c in the second sub-network 102.

So as to enable said terminal devices to share a communication channel in the context of a mechanism of PTT type, the communication system includes SN devices 110 and 120. Each sub-network 101 and 102 is associated with one SN device, to which said terminal device in said sub-network refers in order to take the floor on the communication channel. Thus, in FIG. 1, the first sub-network 101 is associated with a first SN device 110 and the second sub-network 102 is associated with a second SN device 120.

The SN devices' functionalities described hereafter are preferentially implemented at the application layer of the OSI (Open Systems Interconnection) model. Thus each SN device may be implemented on an independent machine, for example according to the architecture presented below in relation to FIG. 2. Each SN device may thus be incorporated in the interconnection device that connects the sub-network, with which said SN device is associated, to the communication link 100. It should also be noted that each interconnection device may be a single item of equipment responsible for implementing the interconnection of one sub-network and the communication link 100, as well as for implementing said sub-network. Each interconnection device may also be a set of equipment, one or more items of equipment being responsible for implementing the interconnection of one sub-network and the communication link 100, and one or more other items of equipment being responsible for implementing said sub-network.

Each sub-network may be a wireless communication cell in which the interconnection device of said cell has access-point or base-station functionalities. For example, each cell is in accordance with the IEEE 802.11 family of standards, also known by the term Wi-Fi (registered trademark). Each sub-network may also be a wired LAN (Local Area Network), or a network of LTE (Long Term Evolution) type. The first 101 and second 102 sub-networks may be of different natures, meaning that the first 101 and second 102 sub-networks may be in accordance with distinct communication technologies.

Such a communication system is particularly useful in emergency and rescue situations. Indeed, emergency and rescue situations in a natural catastrophe context (e.g., avalanche, earthquake, flood) or catastrophe of human origin (e.g., assassination, industrial catastrophe) are often accompanied by a temporary disturbance or even destruction of cellular telecommunication network infrastructures previously deployed on site and/or terrestrial access networks (backhaul network) enabling such infrastructures to be interconnected. It is then necessary to temporarily deploy cells on site and to interconnect these cells with each other to enable the rescuers to communicate and thus coordinate. Satellite connections are then frequently used to interconnect these cells deployed temporarily on site.

Such a communication system may also advantageously be implemented in the context of maintaining in operational conditions a private communication network intended for example for managing and securing operations of critical infrastructures (e.g., nuclear power station, sensitive industrial site). In this context, implementing a communication system, insensitive to the deployment of an emergency satellite link for interconnecting these private networks in the case where terrestrial access networks are inoperative, offers a guarantee of resilience of the communication means.

In the context of the mechanism of PTT type, only one terminal device at a time can take the floor on the shared communication channel, the other terminal devices then being placed in a situation of listening to the terminal device that took the floor.

As already mentioned, a terminal device that has taken the floor on the shared communication channel transmits data to the other terminal devices then placed in a listening situation. These data are for example audio data of voice type. Such a situation occurs when the communication system is a telephony communication system of half-duplex type, meaning that the communication passes in both directions but not simultaneously. The data transmitted during the floor control and to be broadcast to the terminal devices being listening may be of another type, such as for example video or audiovisual data. For example, the terminal devices include a camera and, when a predetermined event occurs on a terminal device, said terminal device requests the floor so as to broadcast to the other terminal devices the video data captured by the camera of said terminal device.

The communication system may comprise a larger quantity of sub-networks. Each sub-network comprises an interconnection device for connecting said sub-network to the other sub-networks. These interconnection devices are then interconnected via one or more communication links, so that each terminal device of a sub-network is able to access said transmission channel after having been authorized by one SN device associated with said sub-network. For reasons of simplicity, implementation of the invention is detailed in a communication system including only two sub-networks, but the principles described herein are applicable identically in a communication system including a larger quantity of sub-networks.

The communication system may be adapted to manage a plurality of groups of terminal devices, the terminal devices in a group having to share a communication channel dedicated to said group. Such groups are typically defined according to a logical organization reflecting the operational reality of teams using the communication system. As a result, each group may be composed of terminal devices distributed in various sub-networks of the communication system and not necessarily present in the same sub-network. It should moreover be noted that a terminal device may belong to a plurality of groups. When a plurality of groups coexist in the communication system, the mechanisms described hereafter are implemented independently for each group.

In the communication system, the first 110 and second 120 SN devices share the same time reference. According to a first example, the first 110 and second 120 SN devices rely on GPS (Global Positioning System) technology for sharing the same time reference. According to a second example, the first 110 and second 120 SN devices rely on NTP (Network Time Protocol) as described in the standard document RFC 5905.

Preferentially, each terminal device shares the same time reference as the SN device associated with the sub-network to which said terminal device belongs.

In a preferential embodiment, the terminal devices and the SN devices communicate in the same communication network by way of messages to the IP (Internet Protocol) format, and in a particular embodiment the data transmitted by said terminal devices over the shared communication channel are of the VoIP (Voice over IP) type.

Figure 2:
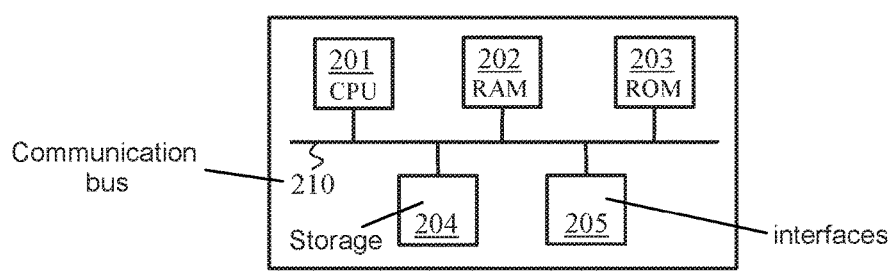
FIG. 2 schematically illustrates an example of hardware architecture of at least one interconnection device in the communication system.

FIG. 2 schematically illustrates an example of hardware architecture of the first SN device 110 and/or of the second SN device 120. Let us consider hereinafter that the example of hardware architecture schematically depicted in FIG. 2 corresponds to the first SN device 110.

The first SN device 110 then includes, connected by a communication bus 210: a processor or CPU (Central Processing Unit) 201; a Random Access Memory (RAM) 202; a Read Only Memory (ROM) 203; a storage unit 204 or a storage medium reader, such as an SD (Secure Digital) card reader or a hard disc drive HDD; and a set of interfaces 205.

The set of interfaces 205 enables the first SN device 110 to communicate with the second SN device 120 via the communication link 100, as well as with the terminal devices of the first sub-network 101. Considering that the hardware architecture example schematically depicted in FIG. 2 corresponds to the second SN device 120, the set of interfaces 205 enables the second SN device 120 to communicate with the first SN device 110, as well as with the terminal devices of the second sub-network 102.

The processor 201 is capable of executing instructions loaded into the RAM 202 from the ROM 203, from an external memory, from a storage medium or from a communication network. When the first SN device 110 is powered up, the processor 201 is capable of reading instructions from the RAM 202 and executing them. These instructions form a computer program causing the implementation by the processor 201 of all or some of the algorithms and steps described hereafter.

All or some of the algorithms and steps described hereafter may thus be implemented in software form by execution of a set of instructions by a programmable machine, such as a processor or a DSP (Digital Signal Processor) or a microcontroller, or be implemented in hardware form by a machine or a dedicated component, such as a FPGA (Field-Programmable Gate Array) or an ASIC (Application-Specific Integrated Circuit).

Figure 3:
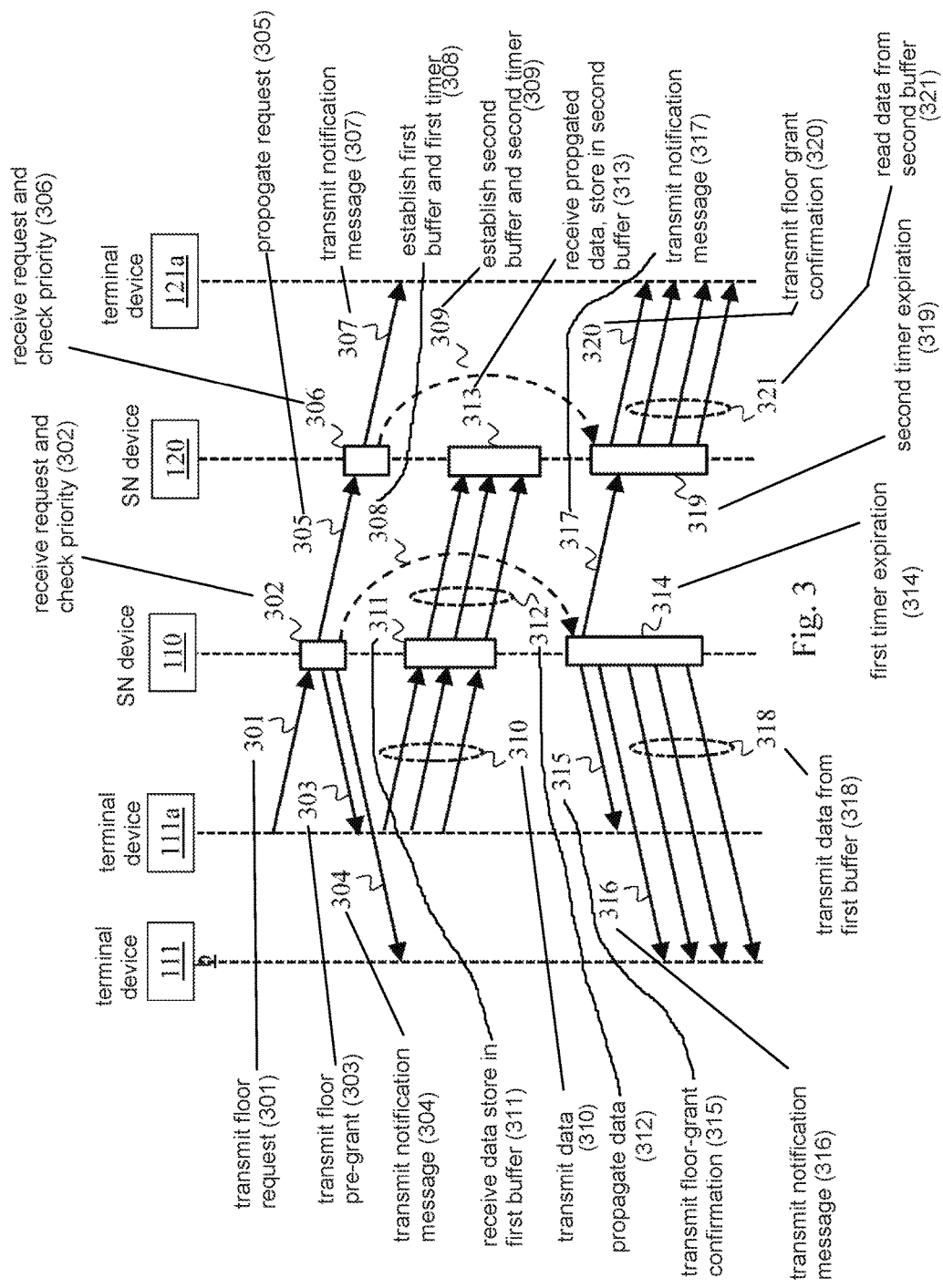
FIG. 3 schematically illustrates first exchanges in the communication system to enable a terminal device to take the floor in the context of a mechanism of PTT type.

FIG. 3 schematically illustrates first exchanges in the communication system for enabling a terminal device to take the floor in the context of the mechanism of PTT type. In the context of FIG. 3, it is considered that the first sub-network 101 comprises the terminal devices 111a and 111b, and that the second sub-network 102 comprises the terminal device 121a. It is further considered that the terminal device 111a attempts to take the floor in the context of the mechanism of PTT type.

In a step 301, the terminal device 111a transmits a floor request to the first SN device 110.

In a step 302, the first SN device 110 receives the request transmitted at the step 301 by the terminal device 111a and checks that there does not exist any floor request that is competing and has a higher priority. A mechanism for determining a floor request with a higher priority is described hereafter in the context of the algorithm in FIG. 7. The first SN device 110 extracts from the received request information representing an instant at which the terminal device 111a transmitted said request. In a preferential embodiment, said information corresponds to a time period that has elapsed between an instant at which the floor release message was received by the terminal device 111a in the context of the last floor control (a reference instant common to the communication network in the case of the very first floor control) and the instant at which the terminal device 111a transmitted said request. In this case, said information represents the reactiveness of the user wishing to access the shared communication channel with respect to the last floor control. It is thus possible to consider that a terminal device seeking to take the floor in a shorter period of time after the last release of the floor has a higher priority, despite the fact that terminal devices are respectively notified of the release of the floor at various instants. In another embodiment, said information corresponds to the instant at which the terminal device 111a transmitted said request according to the shared time reference.

In a step 303, when there does not exist any such competing request with a higher priority, the first SN device 110 transmits a floor pre-grant to the terminal device 111a. A particular embodiment, the transmission of this pre-grant may be delayed, as detailed hereafter in relation to FIG. 5A.

In a step 304, when such a competing request with a higher priority does not exist, the first SN device 110 transmits to the terminal device 111b a notification message representing the pre-grant given to the terminal device 111a. Said notification message may further include an identifier of the terminal device 111a so as to indicate to the terminal device 111b to which terminal device the pre-grant was given. The terminal device 111b then listens to the shared communication channel.

In a preferential embodiment, the step 304 is performed before the step 303. This limits the risk that the terminal device 111b does not make a floor request while a floor request has already been received coming from the terminal device 111a.

In a step 305, when such a competing request with a higher priority does not exist, the first SN device 110 propagates, in the direction of the second SN device 120, the request received at the step 302 from the terminal device 111a. In a preferential embodiment, the step 305 is performed as soon as possible after reception of the floor request. This limits the risk of subsequent conflict, by warning the second SN device 120 as soon as possible.

In a step 306, the second SN device 120 receives the request propagated by the first SN device at the step 305. The second SN device 120 then checks that there does not exist any floor request that is competing and has a higher priority. A mechanism for determining a floor request with a higher priority is described hereafter in the context of the algorithm in FIG. 7. The second SN device 120 extracts from the received request information representing an instant at which the terminal device 111a transmitted said request. In a preferential embodiment, said information corresponds to a time period that has elapsed between an instant at which the floor release message was received by the terminal device 111a in the context of the last floor control (a reference instant common to the communication network in the case of the very first floor control) and the instant at which the terminal device 111a transmitted said request. In another embodiment, said information corresponds to the instant at which the terminal device 111a transmitted said request according to the shared time reference.

In a step 307, when such a competing request with a higher priority does not exist, the second SN device 110 transmits to the terminal device 121a a notification message representing the pre-grant given by the first SN device 110 to the terminal device 111a, the propagation of the request by the first SN device 110 to the second SN device 120 implicitly indicating that the first SN device 110 has given such a pre-grant to the terminal device 111a. The terminal device 121a then listens to the shared communication channel.

In a step 308, when the first SN device 110 determines that a competing request with a higher priority does not exist at the step 302, the first SN device 110 establishes a first buffer dedicated to data that are subsequently transmitted by the terminal device 111a in the context of floor control. The first buffer enables temporarily storing data that the terminal device 111a wishes to transmit via the shared communication channel in the context of floor control. The first SN device 110 also activates a first timer for reading the first buffer, the reading of the first buffer being deactivated as long as the first timer has not elapsed. The duration of the first timer is determined by the first SN device 110 according to the distribution laws $f_\tau(t)$ and $f_\delta(d)$ so as to ensure that the probability $P_{fail}$ is less than the predefined threshold $P_{target}$, as detailed hereinafter in relation to FIG. 5A.

In a step 309, when the second SN device 120 determines that a competing request with a higher priority does not exist at the step 306, the second SN device 120 establishes a second buffer dedicated to data that are subsequently transmitted by the terminal device 111a in the context of floor control. The second buffer enables temporarily storing data that are subsequently transmitted by the terminal device 111a in the context of floor control. The second SN device 120 also activates a second timer for reading the second buffer, the reading of the second buffer being deactivated as long as the second timer has not elapsed. The duration of the second timer is determined by the second SN device 120 according to the distribution laws $f_\tau(t)$ and $f_\delta(d)$ so as to ensure that the probability $P_{fail}$ is less than the predefined threshold $P_{target}$, as detailed hereinafter in relation to FIG. 5B.

It should be noted that the distribution law $f_\tau(t)$ may be the same for each of the SN devices, or be different. In practice, since only the accepted calls are taken into account in the parameters of the distribution law $f_\tau(t)$, the instances of the distribution law $f_\tau(t)$ used by the SN devices are identical since these calls are shared by all the SN devices.

It should also be noted that the instances of the distribution law $f_\delta(d)$ are consistent with each other. This means that, according to the structure of the communication network, the instances of the distribution law $f_\delta(d)$ used by the SN devices may be identical; this is then a homogeneous communication network where the latencies caused in each of the sub-networks are equivalent. The instances of the distribution law $f_\delta(d)$ used by the SN devices may be different, but remain consistent with each other because said instances represent latencies caused in the communication network from the point of view of the SN device in question; this is then a heterogeneous communication network where the latencies caused in each of the sub-networks are substantially different and may change according to the operational context of this communication system. The instances of the distribution law $f_\delta(d)$ used by the SN devices may be different, while remaining consistent with each other, when the users who take the floor are not equitably distributed in the communication network.

Following the pre-grant transmitted by the first SN device 110 at the step 303, the terminal device 111a takes the floor and begins to transmit, in a step 310, data to be broadcast to all the terminal devices being listening, i.e., the terminal devices 111b and 121a. In a step 311, the first SN device 110 receives these data and stores said received data in the first buffer. In a step 312, the first SN device 110 propagates said received data to the second interconnection device 120, meaning that the first SN device 110 does not use the first buffer for propagating said data to the second SN device 120.

In a step 313, the second SN device 120 receives the data propagated by the first SN device 110 at the step 312 and stores them in the second buffer. The same applies for all the data subsequently transmitted by the terminal device 111a in the context of floor control, i.e., storage of the data by the first SN device 110 in the first buffer, propagation in parallel of said data by the first SN device 110 to the second SN device 120 and storage of said data by the second SN device 120 in the second buffer. These subsequent transmissions of data in the context of floor control are not illustrated in FIG. 3 for reasons of simplification.

In a step 314, the first timer that was activated by the first SN device 110 at the step 308 expires. The first SN device 110 then transmits a floor-grant confirmation message to the terminal device 111a in a step 315. The first SN device 110 also transmits to the terminal device 111b, in a step 316, a notification message (floor taken) representing confirmation of floor grant given to the terminal device 111a. The first SN device 110 may also transmit to the second SN device 120, in a step 317, a notification message representing confirmation of floor grant given to the terminal device 111a. The second SN device 120 is then able to indicate, by acknowledgement of said notification message, whether the second SN device 120 has detected a conflict situation requiring dismissing the terminal device 111a or whether the second SN device 120 also confirms floor grant given to the terminal device 111a.

The first SN device 110 then activates reading of the first buffer so as, in a step 318, to transmit the data stored in the first buffer to each terminal device being listening to the shared communication channel and is present in the first sub-network 101, i.e., the terminal device 111b.

In a step 319, the second timer that was activated by the second SN device 120 at the step 309 expires. The second SN device 120 then, in a step 320, transmits to the terminal device 121a a notification message representing confirmation of floor grant given to the terminal device 111a. The second SN device 120 then activates reading of the second buffer so as, in a step 321, to transmit the data stored in the second buffer to each terminal device being listening to the shared communication channel and is present in the second sub-network 102, i.e., the terminal device 121a.

It is considered in the context of FIG. 3 that there does not exist any floor request that is competing and has a higher priority. When the first SN device 110 or the second SN device 120 detects a competing floor request with a higher priority, said SN device refuses that the device 111a takes the floor. This aspect is detailed hereinafter in relation to FIGS. 5A, 5B and 7.

Figure 4:
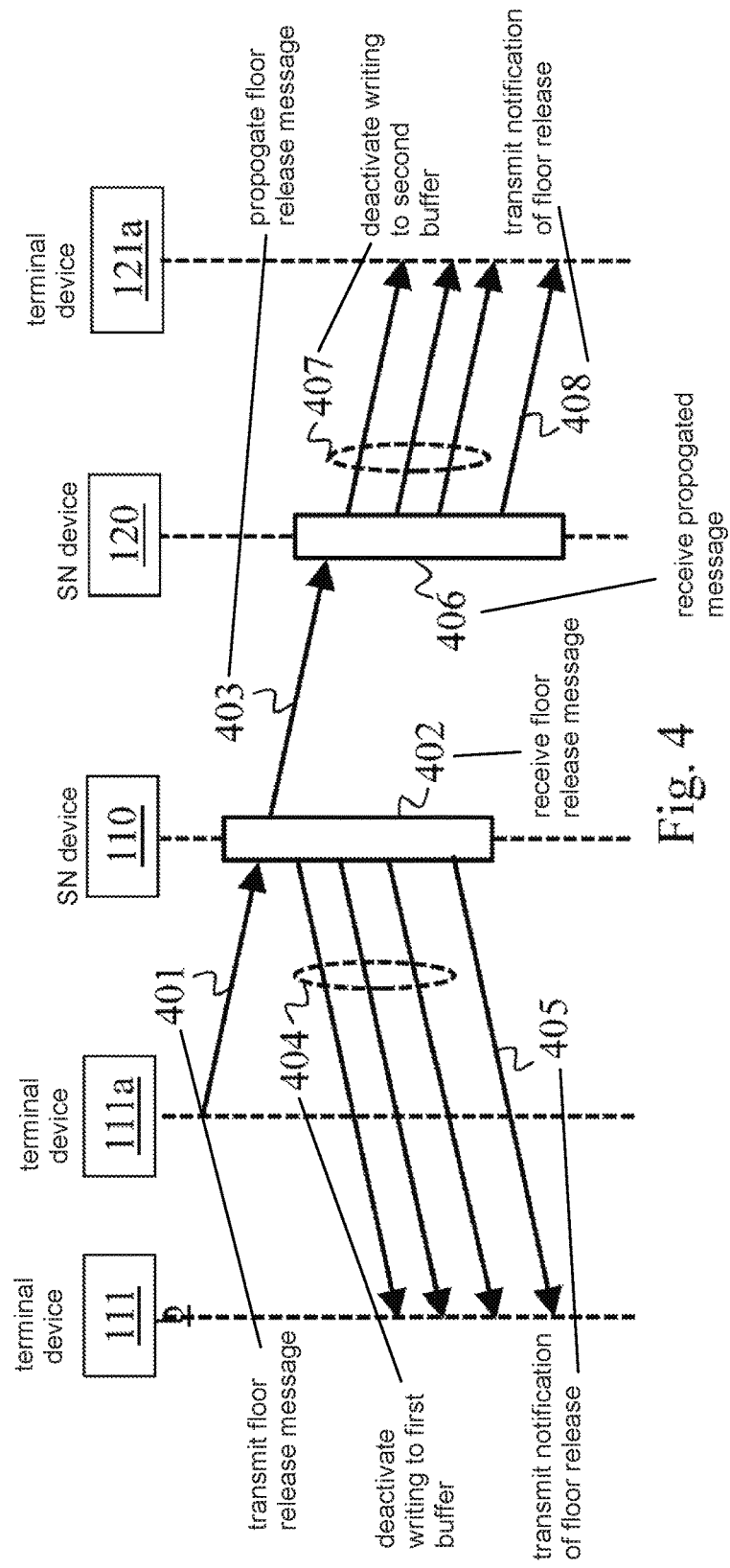
FIG. 4 schematically illustrates second exchanges in the communication system to enable the terminal device to intentionally release the floor in the context of the mechanism of PTT type.

FIG. 4 schematically illustrates second exchanges in the communication system to enable a terminal device to intentionally release the floor in the context of the mechanism of PTT type. In the context of FIG. 4, it is considered that the first sub-network 101 comprises the terminals 111a and 111b, and that the second sub-network 102 comprises the terminal device 121a. It is further considered that the terminal device 111a has taken the floor in the context of the mechanism of PTT type.

In a step 401, the terminal device 111a transmits to the first device SN 110 a floor release message.

In a step 402, the first SN device 110 receives the message transmitted at the step 401 by the terminal device 111a. The first SN device 110 extracts from the received message information representing an instant at which the terminal device 111a transmitted said message.

In a step 403, the first SN device 110 propagates, in the direction of the second SN device 120, the message received at the step 402 from the terminal device 111a.

In a step 404, the first SN device 110 deactivates writing in the first buffer and continues to transmit the data contained in the first buffer until the first buffer is empty. Since the terminal device 111a is not supposed to continue to transmit data in the context of floor control after sending of the floor release message, the first SN device 110 may also abstain from deactivating writing in the first buffer.

Once the first buffer is empty, the first SN device 110 releases the first buffer and, in a step 405, transmits to the terminal device 111b, a notification message representing floor release by the terminal device 111a.

In a step 406, the second SN device 120 receives the message propagated by the first SN device 110 at the step 403. The second SN device 120 extracts from the received message information representing an instant at which the terminal device 111a transmitted said message.

In a step 407, the second SN device 120 deactivates writing in the second buffer and continues to transmit the data contained in the second buffer until the second buffer is empty. Since the terminal device 111a is not supposed to continue to transmit data in the context of floor control after sending of the floor release message, the second SN device 110 may also abstain from deactivating writing in the second buffer.

Once the second buffer is empty, the second SN device 120 releases the second buffer and in step 408 transmits to the terminal device 121b a notification message representing the floor release by the terminal device 111a.

Figure 5A:
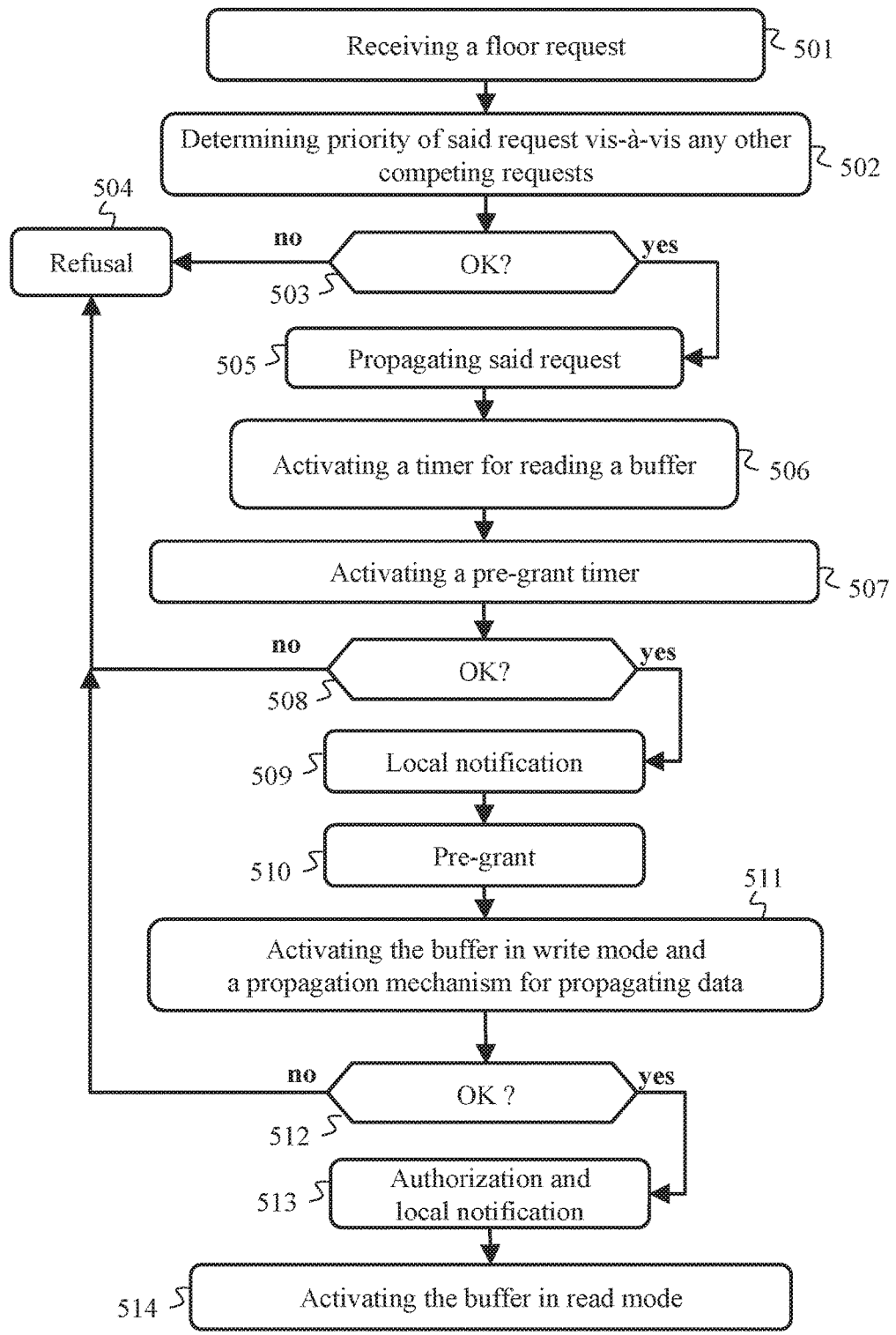
FIG. 5A schematically illustrates an algorithm implemented by a first interconnection device in the communication system for enabling the terminal device to take the floor in the context of the mechanism of PTT type.

FIG. 5A schematically illustrates an algorithm implemented by the first SN device 110 to enable a terminal device present in the first sub-network 101 to take the floor in the context of the mechanism of PTT type. The same principles are applicable by the second SN device 120, to enable a terminal device present in the second sub-network 102 to take the floor in the context of the mechanism of PTT type.

In a step 501, the first SN device 110 receives a floor request from a terminal device present in the first sub-network 101.

In a following step 502, the first SN device 110 determines the priority of the request received at the step 501 vis-à-vis any other floor request that the first SN device 110 would be aware of. The first SN device 110 extracts from the received request information representing an instant at which said terminal device transmitted said request. In a preferential embodiment, said information corresponds to a time period elapsed between an instant at which the floor release message was received by said terminal device in the context of the last floor control (a reference instant common to the communication network in the case of the very first floor control) and the instant at which said terminal device transmitted said request. In another embodiment, said information corresponds to the instant at which said terminal device transmitted said request according to the shared time reference.

In a following step 503, the first SN device 110 checks whether the request received at the step 501 shall be taken into account or whether another request that would be competing and have a higher priority shall be processed. If no other competing request with a higher priority exists, a step 505 is performed; otherwise a step 504 is performed.

In the step 504, the first SN device 110 transmits, to the terminal device that transmitted the request received at the step 501, a refusal notification message vis-à-vis the request received at the step 501. The terminal device that transmitted the request received at the step 501 can then no longer take the floor.

In the step 505, the first SN device 110 propagates the request received at the step 501 to the second SN device 120.

In a following step 506, the first SN device 110 establishes a first buffer dedicated to data that are subsequently transmitted, in the context of floor control, by the terminal device that transmitted the request received at the step 501. Any data transmitted by said terminal device in the context of floor control is then stored in said buffer. The first SN device 110 also activates a timer for reading said buffer, the reading of said buffer being deactivated as long as the timer has not elapsed. The first interconnection device 110 determines the duration of the timer for reading said buffer according to the distribution laws $f_\tau(t)$ and $f_\delta(d)$ so as to ensure that the probability $P_{fail}$ is less than or equal to the predefined threshold $P_{target}$.

In a preferential embodiment, the distribution laws $f_\tau(t)$ and $f_\delta(d)$ are predetermined by way of predefined models.

When the distribution law $f_\tau(t)$ is defined by a model, the distribution law $f_\tau(t)$ is preferentially of the log-normal type and expressed as follows:

$$f_\tau(t) = \frac{1}{t\sigma\sqrt{2\pi}} e^{-\frac{(\log(t)-\mu)^2}{2\sigma^2}}$$

where $\sigma$ represents the standard deviation of the distribution law and $\mu$ represents the mean of the distribution law. $\sigma$ and $\mu$ may be determined by way of a maximum likelihood estimation algorithm.

When the distribution law $f_\delta(d)$ is defined by a model, the distribution law $f_\delta(d)$ is preferentially expressed in the form of a mixture of three-parameter Weibull distribution laws, as follows:

$$f_\delta(d) = \Sigma_i q_i f_{\delta_i}(d)$$

where i is an index on the components of the mixture and $q_i$ represents weighting coefficients such that:

$$\Sigma_i q_i = 1$$

and where:

$$f_{\delta_i}(d) = \frac{s_i}{r_i}\left(\frac{d-l_i}{r_i}\right)^{s_i-1} e^{-\left(\frac{d-l_i}{r_i}\right)^{s_i}} \text{ for } d \geq l_i$$

Each component of the mixture has different parameters $s_i$, $r_i$ and $l_i$, $s_i$ being a shape parameter, $r_i$ a scale parameter and $l_i$ a location parameter. These parameters may be determined by an expectation maximization algorithm.

Preferentially, the first SN device 110 fills in advance in a look-up table LUT that supplies a timer duration according to the pair (t,d) input. This approach is particularly advantageous when the first SN device 110 does not have sufficient computing resources for the time for computing the timer duration to be negligible compared with the timer duration itself, or even when the time for computing the timer duration is greater than the timer duration itself. The content of this look-up table LUT is then determined in advance as follows, for each SN device:

1. Determining parameters for representing the distribution law $f_\tau(t)$, namely the standard deviation $\sigma$ and the mean $\mu$ by way of a maximum likelihood estimation algorithm in the case where the distribution law $f_\tau(t)$ is of log-normal type;

2. Determining parameters for representing the distribution law $f_\delta(d)$ applicable, namely the parameters $s_i$, $r_1$ and as well as the weighting coefficients $q_i$ when the distribution law $f_\delta(d)$ is a mixture of three-parameter Weibull distribution laws;

3. Determining the quantity of terminal devices present in the communication system;

4. Determining $P_{push}$, when $P_{fail}$ is defined as a function of $P_{push}$;

5. Defining minimum and maximum values for the time period t between one floor release and the next floor control, and of network latency d between an instant at which a floor request is transmitted by a terminal device and an instant at which said request is actually received by said SN device;

6. Defining a step between two successive values of the time period t to be considered and a step between two successive values of the network latency d to be considered, so as to define each pair (t,d) to be represented in the look-up table LUT;

7. Defining a maximum acceptable value for the timer $T_b$, for example according to the memory capacities of said SN device;

8. Defining the threshold $P_{target}$;

9. Defining an acceptable margin $\varepsilon$ of error between $P_{fail}$ and $P_{target}$;

10. Determining by bisection, according to the distribution laws $f_\tau(t)$ and $f_\delta(d)$, of a timer value $T_b$ for each pair (t,d) to be represented in the look-up table LUT, so that $P_{target} - P_{fail} \leq \varepsilon$ and so that the timer value $T_b$ is less than the maximum acceptable value for the timer $T_b$; it is also possible to consider that the error margin $\varepsilon$ applies around the value $P_{target}$ and in this case is determined from a timer value $T_b$ for each pair (t,d) to be represented in the look-up table LUT, so that $|P_{target} - P_{fail}| \leq \varepsilon$ and so that the timer value $T_b$ is less than the maximum acceptable value for the timer $T_b$.

Another look-up table LUT may be also be constructed so as to be able to determine the timer duration optionally used for sending the floor pre-grant message. The same filling approach is used for this other look-up table LUT, except that another predefined threshold $P'_{target}$, such that $P'_{target}$ is strictly greater than $P_{target}$, is used in replacement for $P_{target}$.

Figure 5B:
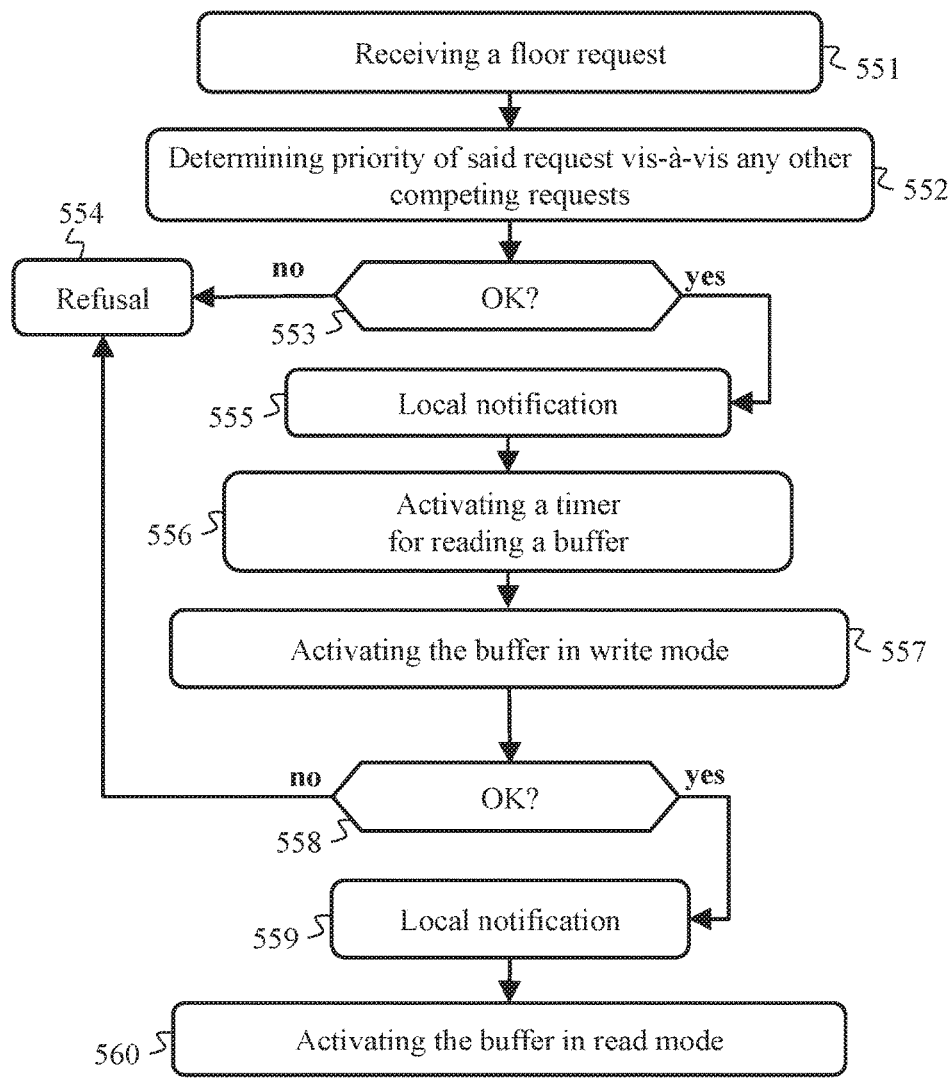
FIG. 5B schematically illustrates an algorithm implemented by a second interconnection device in the communication system for enabling the terminal device to take the floor in the context of the mechanism of PTT type.

Thus, from the information representing the instant at which the terminal device 111a transmitted said request, the first SN device 110 is capable of determining the latency d experienced by said request for arriving at the first SN device 110 (the latency d experienced by said request for arriving at the second SN device 120 in the context of FIG. 5B), and the time period t between the last floor release and the instant at which said request was transmitted. From this pair (t,d) determined for the floor request received at the step 501, the first SN device 110 retrieves the corresponding timer value $T_b$ contained in the look-up table LUT for this pair (t,d).

Since a look-up table LUT cannot represent all the pairs (t,d) because of the quantification related to the definition of the steps, the first SN device 110 may make an interpolation between a plurality of pairs (t,d) approximating the pair (t,d) representing the received floor request.

In an alternative embodiment, the distributions laws $f_\tau(t)$ and $f_\delta(d)$ are predetermined by each of the SN devices according to the long-term statistics previously collected along with message exchanges in the context of the mechanism of PTT type. A look-up table LUT that supplies a timer duration according to the input pair (t,d) may also be constructed in advance on the basis of these statistics.

In a particular embodiment, instances of distribution laws $f_\tau(t)$ and $f_\delta(d)$ are predetermined for each configuration of a set of configurations of the communication network, each of said configurations responding to a distinct operational context (e.g., a first configuration when the communication link 100 is a terrestrial access network and a second configuration when the communication link is a satellite link). For example, each SN device has instances of first distribution laws $f_\tau(t)$ and $f_\delta(d)$ (for example implemented via first respective look-up tables LUT) representing a homogeneous communication network using a communication link 100 of the terrestrial access network type, and each SN device has instances of second distribution laws $f_r(t)$ and $f_\delta(d)$ (for example implemented via second respective look-up tables LUT) representing a heterogeneous communication network using a communication link 100 of the satellite type. In the case of a change in configuration of the communication network, the SN devices respectively select the instances of distribution laws $f_r(t)$ and $f_\delta(d)$ applicable to the actual operational context, e.g., the look-up table LUT corresponding to the new network configuration. In other words, various configurations of the communication network being possible, each SN device selects the distribution law $f_r(t)$ and the distribution law $f_\delta(d)$ to apply from a predefined set of distribution laws, according to an actual configuration of the communication network. Such a change in configuration of the communication network may be detected by each SN device by reception of a message coming from an application managing the mechanism of PTT type to the scale of the communication network and being aware of the changes in topology of the communication network. When each SN device is integrated in or connected to an interconnection device (interconnecting the sub-network with which said SN device is associated and each alternative implementation of the communication link 100), the interconnection device may advise said SN device of a change in interface (e.g., satellite link, terrestrial access network) for implementing the communication link 100.

In a following step 507, the first SN device 110 further activates a floor pre-grant timer. The first interconnection device 110 determines the duration of the floor pre-grant timer according to the distribution laws $f_r(t)$ and $f_\delta(d)$ so as to ensure that the probability $P_{fail}$ is less than or equal to said other predefined threshold $P'_{target}$, which means that the duration of the floor pre-grant timer is strictly less than the duration of the timer for reading said buffer. The duration of the floor pre-grant timer is thus determined in the same way as the duration of the timer for reading said buffer, but using a different predefined threshold.

In a following step 508, the first SN device 110 determines whether another request that would be competing and having a higher priority is received before the floor pre-grant timer expires. If such other request is received, the step 504 is performed; otherwise, when the floor pre-grant timer has expired, a step 509 is performed.

In the step 509, the first SN device 110 transmits, to each terminal device of the first sub-network 101 being listening, other than the terminal device that sent the request received at the step 501, a notification message representing a floor pre-grant given to the terminal device that transmitted the request received at the step 501.

In a following step 510, the first SN device 110 transmits a floor pre-grant message to the terminal device that sent the request received at the step 501. In a particular embodiment, as already described in relation to FIG. 3, the transmission of the floor pre-grant message is not delayed. Delaying the transmission of the floor pre-grant message does however allows limiting the risks of wrongly accepting a floor request, in particular vis-à-vis competing requests emanating from terminal devices present on the first sub-network 101.

In a following step 511, the first SN device 110 activates the buffer in write mode to store data transmitted by said terminal device in the context of floor control. The first SN device 110 also activates a propagation mechanism for propagating the data transmitted by said terminal device in the context of floor control. The data propagation mechanism is such that the data received by the first SN device 110 from said terminal device in the context of floor control are propagated by the first SN device 110 to the second SN device 120, without having to pass through said buffer.

In a following step 512, the first SN device 110 determines whether another request that would be competing and have a higher priority is received before the timer for reading said buffer expires. If such other request is received, the step 504 is performed, in which the first SN device 110 releases said buffer and cancels the timer for reading said buffer; otherwise, when the timer for reading said buffer has expired, a step 513 is performed.

In the step 513, the first SN device 110 transmits a floor grant confirmation message to the terminal device that sent the request received at the step 501. The first SN device 110 transmits, to each terminal device of the first sub-network 101 being listening, i.e., other than the terminal device that sent the request received at the step 501, a notification message representing the floor grant confirmation.

In a following step 514, the first SN device 110 activates said buffer in read mode. In other words, the first SN device 110 begins to transmit, to each terminal device of the first sub-network 101 being listening, i.e., other than the terminal device that transmitted the request received at the step 501, the data contained in said buffer. The data contained in said buffer are extracted from the buffer and transmitted in the first sub-network 101 substantially at the rate at which the first SN device 110 received said data from the terminal device that transmitted the request received at the step 501.

FIG. 5B schematically illustrates an algorithm implemented by the second SN device 120 to enable a terminal device present in the first sub-network 101 to take the floor in the context of the mechanism of PTT type. The same principles are applicable by the first SN device 110 to enable a terminal device present in the second sub-network 102 to take the floor in the context of the mechanism of PTT type.

In a step 551, the second SN device 120 receives a floor request coming from the first SN device 110. Said floor request is originally transmitted by a terminal device present in the first sub-network 101 and was propagated by the first SN device 110.

In a following step 552, the second SN device 120 determines the priority of the request received at the step 551 vis-à-vis any other floor request that the second SN device 120 would be aware of. The second SN device 120 extracts from the received request information representing an instant at which said terminal device transmitted said request. In a preferential embodiment, said information corresponds to a time period elapsed between an instant at which the floor release message was received by said terminal device in the context of the last floor control (a reference instant common to the communication network in the case of the very first floor control) and the instant at which said terminal device transmitted said request. In another embodiment, said information corresponds to the instant at which said terminal device transmitted said request according to the shared time reference.

In a following step 553, the second SN device 120 checks whether the request received at the step 551 shall be taken into account or whether another request that would be competing and have a higher priority shall be processed. If no other competing request with a higher priority exists, a step 555 is performed; otherwise the step 554 is performed.

In the step 554, the second SN device 120 transmits to the first SN device 110 a refusal notification message vis-à-vis the request received at the step 551. The terminal device being the source of the request received at the step 551 cannot then take the floor.

In the step 555, the second SN device 120 transmits, to each terminal device of the second sub-network 102 being listening, a notification message representing a floor pre-grant given to the terminal device being the source of the request received at the step 551.

In a following step 556, the second SN device 120 establishes a buffer dedicated to data that are subsequently transmitted, in the context of floor control, by the terminal device being the source of the request received at the step 551. Any data transmitted subsequently by said terminal device in the context of floor control is then stored in said buffer. The second SN device 120 also activates a timer for reading said buffer, the reading of said buffer being deactivated as long as the timer has not elapsed. The second SN device 120 determines the duration of the timer for reading said buffer according to the distribution laws $f_\tau(t)$ and $f_\delta(d)$ so as to ensure that the probability $P_{fail}$ is less than or equal to the predefined threshold $P_{target}$. The second SN device 120 determines the duration of the timer for reading said buffer in the same way as the first SN device 110 does so in the context of the algorithm in FIG. 5A. This allows ensuring that the readings of the buffers respectively implemented by the first 110 and second 120 SN devices are substantially triggered at the same time, since the distribution law $f_\tau(t)$ is in practice identical for all the SN devices and the instance of the distribution law $f_\delta(d)$ used by each of the SN devices is consistent with the instances of the distribution law $f_\delta(d)$ respectively used by the other SN devices.

In a following step 557, the second SN device 120 activates the buffer in write mode to enable storing data propagated by the first SN device 110 in the context of floor control by the terminal device being the source of the request received at the step 551.

In a following step 558, the second SN device 120 determines whether another request that would be competing and have a higher priority is received before the timer for reading said buffer expires. If such other request is received, the step 554 is performed, in which the second SN device 120 releases said buffer and cancels the timer for reading said buffer; otherwise, when the timer for reading said buffer has expired, a step 559 is performed.

In the step 559, the second SN device 110 transmits, to each terminal device in the second sub-network 102 being listening, a notification message representing a floor grant confirmation by the terminal device being the source of the request received at the step 551.

In a following step 560, the second SN device 120 activates said buffer in read mode. In other words, the second SN device 120 begins to transmit the data contained in said buffer to each terminal device in the second sub-network 102 being listening. The data contained in said buffer are extracted from said buffer and transmitted in the second sub-network 102 substantially at the rate at which the second SN device 120 received said data from the first SN device 110.

Figure 6A:
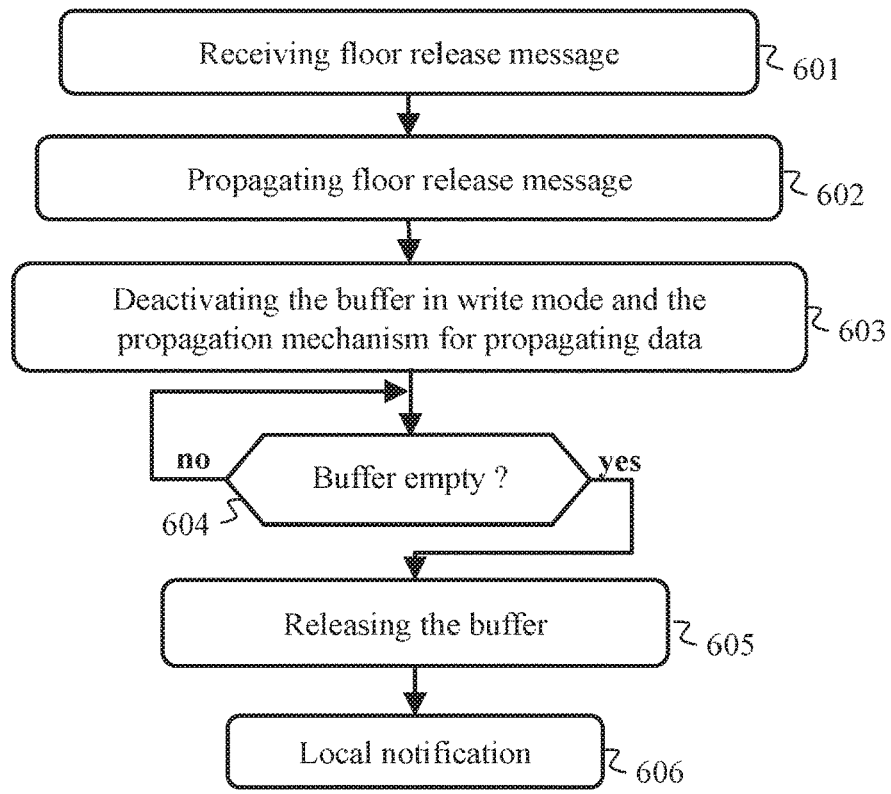
FIG. 6A schematically illustrates an algorithm implemented by the first interconnection device for enabling the terminal device to intentionally release the floor in the context of the mechanism of PTT type.

FIG. 6A schematically illustrates an algorithm implemented by the first SN device 110 to enable a terminal device present on the first sub-network 101 to intentionally release the floor in the context of the mechanism of PTT type. The same principles are applicable by the second SN device 120, to enable a terminal device present in the second sub-network 102 to intentionally release the floor in the context of the mechanism of PTT type.

In a step 601, the first SN device 110 receives a floor release message coming from the terminal device present in the first sub-network 101 and to which the floor was previously granted. The first SN device 110 extracts from the received message information representing an instant at which the terminal device 111a transmitted said message.

In a following step 602, the first SN device 110 propagates the message received at the step 601 to the second SN device 120.

In a following step 603, the first SN device 110 deactivates the writing in the buffer the reading of which was activated at the step 514. Since the terminal device that transmitted the message received at the step 601 is not supposed to continue to transmit data in the context of floor control after sending of the floor release message, the first SN device 110 may also abstain from deactivating writing in said buffer.

In a following step 604, the first SN device 110 checks whether the buffer the reading of which was activated at the step 514 is empty. Reading of the buffer is maintained until said buffer is empty, so as to transmit the data stored in said buffer to each terminal device in the first sub-network 101 being listening, i.e., with the exception of the terminal device that transmitted the message received at the step 601. When said buffer is empty, a step 605 is performed; otherwise the step 604 is reiterated.

In the step 605, the first SN device 110 releases said buffer.

In a following step 606, the first SN device 110 transmits, to each terminal device in the first sub-network 101 being listening, i.e., with the exception of the terminal device that transmitted the message received at the step 601, a notification message representing floor release by the terminal device that transmitted the message received at the step 601.

Figure 6B:
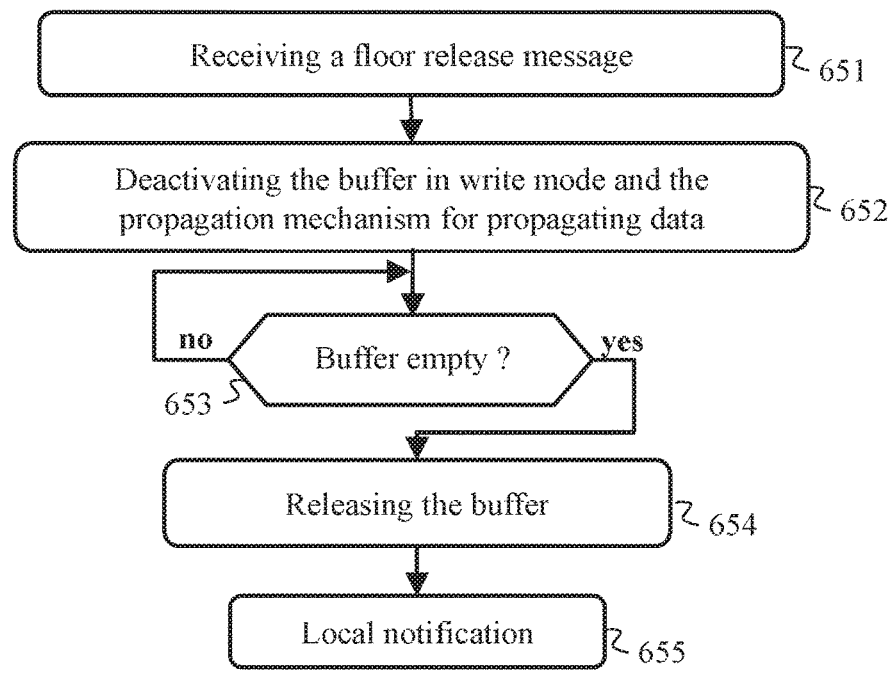
FIG. 6B schematically illustrates an algorithm implemented by the second interconnection device for enabling the terminal device to intentionally release the floor in the context of the mechanism of PTT type.

FIG. 6B schematically illustrates an algorithm implemented by the second SN device 120 to enable a terminal device present on the first sub-network 101 to intentionally release the floor in the context of the mechanism of PTT type. The same principles are applicable by the first SN device 110, to enable a terminal device present in the second sub-network 102 to intentionally release the floor in the context of the mechanism of PTT type.

In a step 651, the second SN device 120 receives a floor release message coming from the first SN device 110. Said floor release message is originally transmitted by a terminal device present in the first sub-network 101 and to which the floor was previously granted, and was propagated by the first SN device 110. The second SN device 120 extracts from the received message information representing an instant at which the terminal device 111a transmitted said message.

In a following step 652, the second SN device 120 deactivates the writing in the buffer the reading of which was activated at the step 560. Since the terminal device that transmitted the message received at the step 651 is not supposed to continue to transmit data in the context of floor control after sending of the floor release message, the second SN device 120 may also abstain from deactivating writing in said buffer.

In a following step 653, the second SN device 120 checks whether the buffer is empty. Reading of the buffer is maintained until said buffer is empty, so as to transmit the data stored in said buffer to each terminal device in the second sub-network 102 being listening. When said buffer is empty, a step 654 is performed; otherwise the step 653 is reiterated.

In the step 654, the second SN device 120 releases said buffer.

In a following step 655, the second SN device 120 transmits, to each terminal device in the second sub-network 102 being listening, a notification message representing the floor release by the terminal device being the source of the floor release message received at the step 651.

Figure 7:
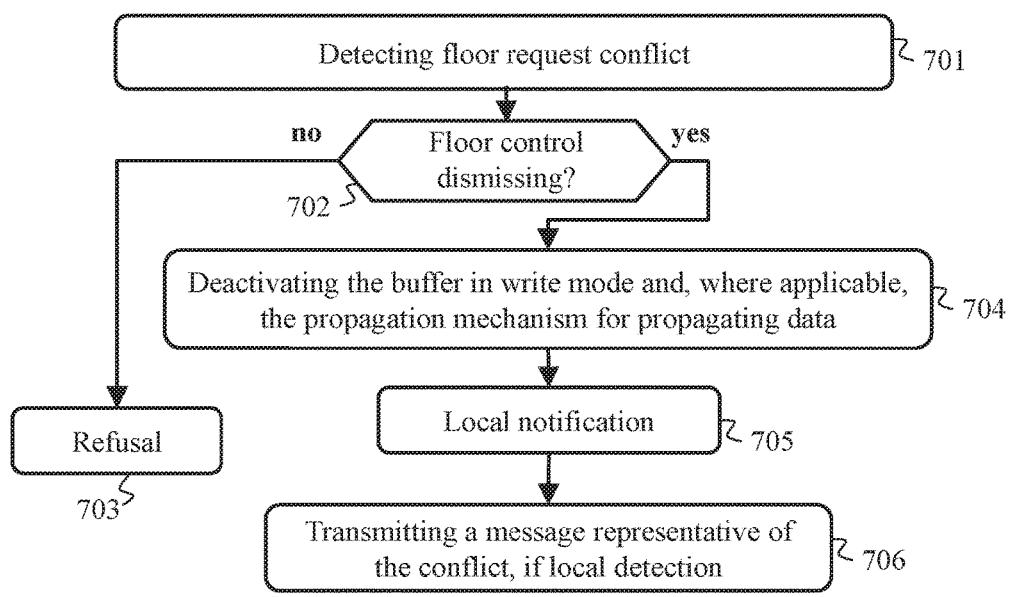
FIG. 7 schematically illustrates an algorithm implemented by an interconnection device in the communication system for managing a floor control conflict in the context of the mechanism of PTT type.

FIG. 7 schematically illustrates an algorithm implemented by the first SN device 110 and by the second SN device 120 for managing a floor control conflict in the context of the mechanism of PTT type. Let us consider the case where the algorithm in FIG. 7 is implemented by the first SN device 110. The same principles apply in the case where the algorithm in FIG. 7 is implemented by the second SN device 120.

In a step 701, the first SN device 110 detects a conflict of floor requests. Such a conflict is detected when a floor request originating from a first terminal device is received by the first interconnection device 110 when the floor has already been granted to a second terminal device. Such a conflict is also detected when the first interconnection device 110 has to process a plurality of floor requests, the respective origins of which are distinct terminal devices. Such a conflict is also detected when the first SN device 110 is informed by the second SN device 120 that such a conflict exists.

When the first interconnection device 110 has to process a plurality of floor requests the respective origins of which are distinct terminal devices, the first SN device 110 determines which floor request has the highest priority.

In a particular embodiment, each floor request is associated with an explicit or tacit priority level. Said priority level is tacit when, without mention of said priority level in said floor request, the first interconnection device 110 is able to determine the priority level of said request. For example, the terminal devices may be associated with a predefined priority level, e.g., in the context of a deployment of the communication system in emergency and rescue situations, terminal devices held by rescuers in charge of coordinating actions on the ground may be associated with higher priority levels than rescuers responsible for performing the actions on the ground.

In a preferential embodiment, the first SN device 110 determines which floor request has the timewise highest priority, so as to limit the risk of not complying with the floor control attempt chronology (i.e., the risk that a user X having chronologically attempted to speak before a user Y is heard after the user Y by at least one user Z). Each floor request preferentially includes information on the time period elapsed between an instant at which the floor release message was received by the concerned terminal device in the context of the last floor control (a reference instant common to the communication network in the case of the very last control of the floor) and the instant at which said concerned terminal device transmitted said floor request. In this case, said information represents the reactiveness of the user to wishing to access the shared communication channel with respect to the last floor control. It is thus possible to consider that a terminal device seeking to take the floor within a shorter time period after the last floor release has a timewise higher priority, despite the fact that the terminal devices are respectively notified of the floor release at different instants. Alternatively, each floor request includes information representing the instant at which the concerned terminal device transmitted the floor request according to the shared time reference. It is thus possible to consider that a terminal device seeking to take the floor as soon as possible in the light of the shared time reference has the timewise highest priority.

In a particular embodiment, the first SN device 110 seeks to determine the explicit or tacit priority level associated with each floor request. The first SN device 110 then considers the request associated with the highest priority level to be the request with the highest priority. And, when the first SN device 110 is faced with two floor requests that are explicitly or tacitly associated with the same priority level, the first SN device 110 seeks to determine which request has the timewise highest priority.

In a step 702, the first SN device 110 checks whether the detected conflict requires dismissing a terminal device of the floor control that had previously been pre-granted to said terminal device or where the floor had been confirmed to said terminal device. This is in particular the case when the first SN device 110 is informed by the second SN device 120 that a conflict exists. If the detected conflict requires dismissing a terminal device of the floor control, a step 704 is performed; otherwise a step 703 is performed.

In the step 703, the first SN device 110 refuses any floor request which, in the context of the conflict, does not have the highest priority. When said floor request comes from a terminal device in the first sub-network 101, the first SN device 110 transmits to said terminal device a notification message representing a refusal of the floor. When said floor request comes from a terminal device in the second sub-network 102, meaning that said floor request has been propagated by the second SN device 120, the first SN device 110 transmits to the second interconnection device 120 a notification message representing a refusal of the floor.

In the step 704, the first SN device 110 deactivates the buffer that was previously established, at the step 511 or at the step 557, for the floor-taking by said terminal device. When said terminal device is present in the first sub-network 101, the first SN device 110 further deactivates the propagation mechanism for propagating, in the direction of the second SN device 120, data transmitted by said terminal device in the context of said floor control.

In a following step 705, the first SN device 110 sends, to each terminal device that is present on the first sub-network 101, a message notifying dismissal of the floor control that had been pre-granted or confirmed to said terminal device. When said terminal device is present in the first sub-network 101, said terminal device receives said notification message and stops sending data accordingly. Thus, when said terminal device is present on the first sub-network 101, said terminal device is notified that the floor is refused to said terminal device.

In a following step 706, when the first SN device 110 has itself detected the conflict, meaning that the first SN device 110 has not been informed of the conflict by the second SN device 120, the first SN device 110 informs the second SN device 120 of the detected conflict.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for managing floor control on a shared communication channel in the context of half-duplex communications implemented in a communication network composed of a plurality of interconnected sub-networks, each sub-network being associated with a supernode device of the communication network, the method being implemented by one said supernode device, wherein, when a first floor request is received from a terminal device of the sub-network with which said supernode device is associated and said supernode device is not aware of at least one second floor request with higher priority, the method comprising:

propagating, by said supernode device, the first floor request to each other supernode device;

transmitting, by said supernode device, a floor pre-grant message to said terminal device so as to enable said terminal device to take the floor;

transmitting, by said supernode device, a floor pre-grant notification message to each other terminal device in the sub-network with which said supernode device is associated, so that each said other terminal device listens to the shared communication channel;

determining, by said supernode device, a timer duration according to a distribution law $f_\tau(t)$ for time period between floor release and a next floor control, and a distribution law $f_\delta(d)$ for network latency between an instant at which a floor request is transmitted by a terminal device and an instant at which said request is actually received by said supernode device, so that the probability $P_{fail}$ of dismissing said terminal device of the floor control is below a first predefined threshold;

storing, by said supernode device, in a buffer data received from said terminal device in the context of floor control, and propagating said data to each other supernode device;

activating, by said supernode device, the buffer in read mode for broadcasting the stored data to each terminal device being listening on the sub-network associated with said supernode device, when said timer has elapsed; and wherein, when the first floor request is received from a terminal device in a sub-network other than the one with which said supernode device is associated and said supernode device is not aware of at least one second floor request with higher priority, the method further comprising:

transmitting, by said supernode device, a floor pre-grant notification message to each terminal device in the sub-network with which the supernode device is associated, so that each terminal device in said sub-network listens to the shared communication channel;

determining, by said supernode device, the duration of the timer according to the distribution law $f_\tau(t)$ and the distribution law $f_\delta(d)$, so that the probability $P_{fail}$ of dismissing said terminal device of the floor control is below the first predefined threshold;

storing, by said supernode device, in the buffer data propagated by another supernode device in the context of floor control;

activating, by said supernode device, the buffer in read mode for broadcasting the stored data to each terminal device being listening on the sub-network associated with said supernode device, when said timer has elapsed; and wherein, when said supernode device detects at least one second floor request with higher priority before expiry of said timer, said supernode device releases the buffer and, when said first request has been received from a terminal device in the sub-network with which said supernode device is associated, said supernode device notifies said terminal device that said terminal device is refused floor control.

2. The method according to claim 1, wherein said supernode device transmits the floor pre-grant message after expiry of another timer of given duration according to the distribution law $f_\tau(t)$ and the distribution law $f_\delta(d)$, so that the probability of dismissing said terminal device of the floor control is below a second predefined threshold strictly greater than said first threshold.

3. The method according to claim 1, wherein the distribution law $f_\tau(t)$ is defined by a model of log-normal type and expressed as follows:

$$f_\tau(t) = \frac{1}{t\sigma\sqrt{2\pi}} e^{-\frac{(\log(t)-\mu)^2}{2\sigma^2}}$$

where $\sigma$ represents a standard deviation of the distribution law $f_\tau(t)$ and $\mu$ represents a mean of the distribution law $f_\tau(t)$.

4. The method according to claim 1, wherein the distribution law $f_\delta(d)$ is defined by a model in the form of a mixture of three-parameter Weibull distribution laws and expressed as follows:

$$f_\delta(d) = \sum_i q_i f_{\delta_i}(d)$$

where i is an index on the components of the mixture and $q_i$ represents weighting coefficients such that:

$$\sum_i q_i = 1$$

and where:

$$f_{\delta_i}(d) = \frac{s_i}{r_i}\left(\frac{d-l_i}{r_i}\right)^{s_i-1} e^{-\left(\frac{d-l_i}{r_i}\right)^{s_i}} \text{ for } d \geq l_i$$

where $s_i$ is a shape parameter, $r_i$ a scale parameter and $l_i$ a location parameter.

5. The method according to claim 1, wherein the distribution laws $f_\tau(t)$ and $f_\delta(d)$ are predetermined by said supernode device according to long-term statistics previously collected along with message exchanges in the context of the half-duplex communications.

6. The method according to claim 1, wherein the probability $P_{fail}$ of dismissing said terminal device of the floor control is expressed as follows:

$$P_{fail} = 1 - \sum_{k=0}^{N-1} \binom{N-1}{k} P_{push}^k (1-P_{push})^{N-1-k} (1-P'_{fail})^k$$

where $P_{push}$ represents a probability for a terminal device to request the floor control determined by said supernode device by counting the number of competing floor requests detected for each floor control granted, namely:

$$P_{push} = \left(\sum_{q=1}^{Q} \frac{R_q - 1}{N - 1}\right) / Q$$

where $R_q$ represents a quantity of competing requests received for each floor control granted q with $R_q \geq 1$ and where Q represents a quantity of considered granted floor controls;
and where:

$$P_{fail} = \frac{Prob\{T_1 + d_1 + T_b < T_2 + d_2 \,\&\, T_1 > T_2\}}{Prob\{T_1 + d_1 < T_2 + d_2 \,\&\, T_1 > T_2\} + Prob\{T_1 + d_1 < T_2 + d_2 \,\&\, T_1 < T_2\}}$$

where: Prob{x} represents a probability of an expression represented by x is satisfied and where $T_1$ represents an instant at which said first floor request has been transmitted, $T_2$ represents the instant at which a second floor request with higher priority has been transmitted, $d_1$ represents a transmission latency experienced by said first floor request in the communication network, $d_2$ represents a transmission latency experienced by said second floor request in the communication network, and $T_b$ represents the duration of the timer, the expiration of which triggers reading of said buffer.

7. The method according to claim 1, wherein each floor request includes information representing a time period elapsed between an instant at which a floor-release message has been received in the context of the last floor control by the terminal device that transmitted said floor request and the instant at which said terminal device transmitted said request.

8. The method according to claim 7, wherein said supernode device considers that one said second floor request has a timewise higher priority than said first floor request when the time period represented by said information included in said second floor request is shorter than said time period represented by said information included in said first floor request.

9. The method according to claim 1, wherein, for determining the duration of said timer, the method further comprises:
determining, by said supernode device, a time period t elapsed between an instant at which a floor-release message was received in the context of the last floor control by the terminal device that transmitted said first floor request and the instant at which said terminal device transmitted said first floor request;
determining, by said supernode device, a latency d experienced by said first floor request between the transmission of said first floor request by said terminal device and the reception of said first floor request by said supernode device; and
determining, by said supernode device, the duration of said timer from a look-up table that supplies a timer duration according to a set of predefined pairs (t,d) the content of the look-up table being previously defined according to the distribution law $f_\tau(t)$ and the concerned distribution law $f_\delta(d)$ so that the probability $P_{fail}$ of dismissing a terminal device of the floor control is below the first predefined threshold.

10. The method according to claim 9, wherein, for filling the look-up table, the method further comprises:
determining, by a device, parameters for representing the distribution law $f_\tau(t)$;
determining, by a device, parameters for representing the applicable distribution law $f_\delta(d)$;
determining, by a device a quantity of terminal devices present in the communication system;
defining, by a device, minimum and maximum values of time period t between a floor release and the next floor control, and of network latency d between an instant at which a floor request is transmitted by a terminal device and an instant at which said request is actually received by said supernode device;
defining, by a device, a step between two successive values of time period t to be considered and a step between two successive values of network latency d to be considered, so as to define each pair (t,d) to be represented in the look-up table;
defining, by a device, an acceptable maximum value for the duration of the timer;
defining, by a device, the value of said first threshold;
defining, by a device, an acceptable error margin ε; and
determining, by a device, by bisection, according to the distribution laws $f_\tau(t)$ and $f_\delta(d)$, a timer duration for each pair (t,d) to be represented in the look-up table, so that the probability $P_{fail}$ of dismissing a terminal device of the floor control is at a distance from the predefined threshold less than said acceptable error margin ε and so that the timer duration is less than said acceptable maximum value.

11. The method according to claim 1, wherein, when a floor-release message is received from said terminal device and said terminal device is on the sub-network with which said supernode device is associated, the method further comprising:
propagating, by said supernode device, said received floor-release message to each other supernode device;
transmitting, by said supernode device, a floor-release notification message to each other terminal device in the sub-network with which the supernode device is associated, after the buffer has been emptied; and
releasing, by said supernode device, the buffer; and,
when a floor-release message is received from said terminal device and said terminal device is on a sub-network other than the one with which said supernode device is associated, the method further comprising:
transmitting, by said supernode device, a floor-release notification message to each terminal device in the sub-network with which the supernode device is associated, after the buffer had been emptied; and
releasing, by said supernode device, the buffer.

12. The method according to claim 1, wherein, various configurations of the communication network being possible, said supernode device selects the distribution law $f_\tau(t)$ and the distribution law $f_\delta(d)$ from a predefined set of distribution laws, according to an actual configuration of the communication network.

13. A method for managing floor control on a shared communication channel in the context of half-duplex communications implemented in a communication network composed of a plurality of interconnected sub-networks, each sub-network being associated with a supernode device in the communication network, the method being implemented by one said supernode device, wherein, when a first floor request is received from a terminal device of the sub-network with which said supernode device is associated and said supernode device is not aware of at least one second floor request with higher priority, the method comprising:

propagating, by said supernode device, the first floor request to each other supernode device;

transmitting, by said supernode device, a floor pre-grant message to said terminal device so as to enable said terminal device to take the floor;

transmitting, by said supernode device, a floor pre-grant notification message to each other terminal device in the sub-network with which said supernode device is associated, so that each said other terminal device listens to the shared communication channel;

determining, by said supernode device, a timer duration according to a distribution law $f_\tau(t)$ for time period between a floor release and a next floor control, and a distribution law $f_\delta(d)$ for network latency between an instant at which a floor request is transmitted by a terminal device and an instant at which said request is actually received by said supernode device, so that the probability $P_{fail}$ of dismissing said terminal device of the floor control is below a first predefined threshold;

storing, by said supernode device, in a buffer data received from said terminal device in the context of floor control, and propagating said data to each other supernode device; and activating, by said supernode device, the buffer in read mode for broadcasting the stored data to each terminal device being listening on the sub-network associated with said supernode device, when said timer has elapsed; and wherein, when said supernode device detects at least one second floor request with higher priority before expiry of said timer, the method further comprising:

releasing, by said supernode device, the buffer; and notifying, by said supernode device, said terminal device that said terminal device is refused floor control.

14. A method for managing floor control on a shared communication channel in the context of half-duplex communications implemented in a communication network composed of a plurality of interconnected sub-networks, each sub-network being associated with a supernode device in the communication network, the method being implemented by a said supernode device, wherein, when a first floor request is received from a terminal device in a sub-network other than the one with which said supernode device is associated and said supernode device is not aware of at least one second floor request with higher priority, the method comprising:

transmitting, by said supernode device, a floor pre-grant notification message to each terminal device in the sub-network with which the supernode device is associated, so that each terminal device in said sub-network listens to the shared communication channel;

determining, by said supernode device, the duration of the timer according to a distribution law $f_\tau(t)$ for time period between a floor release and the next floor control, and a distribution law $f_\delta(d)$ for network latency between an instant at which a floor request is transmitted by a terminal device and an instant at which said request is actually received by said supernode device, so that the probability $P_{fail}$ of dismissing said terminal device of the floor control is below a predefined threshold;

storing, by said supernode device, in a buffer data propagated by another supernode device in the context of floor control;

activating, by said supernode device, the buffer in read mode for broadcasting the stored data to each terminal device being listening on the sub-network associated with said supernode device, when said timer has elapsed; and wherein, when said supernode device detects at least one second floor request with higher priority before expiry of said timer, said supernode device releases the buffer.

15. A supernode device configured for managing floor control on a shared communication channel in the context of half-duplex communications implemented in a communication network composed of a plurality of interconnected sub-networks, each sub-network being associated with a supernode device in the communication network, wherein, when a first floor request is received from a terminal device in the sub-network with which said supernode device is associated and said supernode device is not aware of at least one second floor request with higher priority, said supernode device comprising:

a machine or a dedicated component so that the supernode is in hardware form configured for, or a programmable machine and a memory storing a set of instructions so that the supernode is in software form configured by execution of the set of instruction by the programmable machine for:

propagating the first floor request to each other supernode device;

transmitting a floor pre-grant message to said terminal device so as to enable said terminal device to take the floor;

transmitting a floor pre-grant notification message to each other terminal device in the sub-network with which said supernode device is associated, so that each said other terminal device listens to the shared communication channel;

determining a timer duration according to a distribution law $f_\tau(t)$ for time period between a floor release and a next floor control, and a distribution law $f_\delta(d)$ for network latency between an instant at which a floor request is transmitted by a terminal device and an instant at which said request is actually received by said supernode device, so that the probability $P_{fail}$ of dismissing said terminal device of the floor control is below a first predefined threshold;

storing in a buffer data received from said terminal device in the context of floor control, and propagating said data to each other supernode device;

activating the buffer in read mode for broadcasting the stored data to each terminal device being listening on the sub-network associated with said supernode device, when said timer has elapsed; and wherein, when the first floor request is received from a terminal device in a sub-network other than the one with which said supernode device is associated and said supernode device is not aware of at least one second floor request with higher priority, said supernode device is further configured for:

transmitting a floor pre-grant notification message to each terminal device in the sub-network with which the supernode device is associated, so that each terminal device in said sub-network listens to the shared communication channel;

determining the duration of the timer according to the distribution law $f_\tau(t)$ and the distribution law $f_\delta(d)$, so that the probability $P_{fail}$ of dismissing said terminal device of the floor control is below the first predefined threshold;

storing in the buffer data propagated by another supernode device in the context of floor control;

activating the buffer in read mode for broadcasting the stored data to each terminal device being listening on the sub-network associated with said supernode device, when said timer has elapsed; and wherein, when said supernode device detects at least one second floor request with higher priority before expiry of said timer, said supernode device is further configured for releasing the buffer and, when said first request has been received from a terminal device in the sub-network with which said supernode device is associated, said supernode device is further configured for notifying said terminal device that said terminal device is refused floor control.

16. A supernode device configured for managing floor control on a shared communication channel in the context of half-duplex communications implemented in a communication network composed of a plurality of interconnected sub-networks, each sub-network being associated with a supernode device in the communication network, wherein, when a first floor request is received from a terminal device in the sub-network with which said supernode device is associated and said supernode device is not aware of at least one second floor request with higher priority, said supernode device comprising:

a machine or a dedicated component so that the supernode is in hardware form configured for, or a programmable machine and a memory storing a set of instructions so that the supernode is in software form configured by execution of the set of instruction by the programmable machine for:

propagating the first floor request to each other supernode device;

transmitting a floor pre-grant message to said terminal device so as to enable said terminal device to take the floor;

transmitting a floor pre-grant notification message to each other terminal device in the sub-network with which the supernode device is associated, so that each said other terminal device listens to the shared communication channel;

determining a duration of a timer according to a distribution law $f_\tau(t)$ for time period between a floor release and the next floor control, and a distribution law $f_\delta(d)$ for network latency between an instant at which a floor request is transmitted by a terminal device and an instant at which said request is actually received by said supernode device, so that the probability $P_{fail}$ of dismissing said terminal device of the floor control is below a predefined threshold;

storing in a buffer data received from said terminal device in the context of floor control, and propagating said data to each other supernode device; and activating the buffer in read mode for broadcasting the stored data to each terminal device being listening on the sub-network associated with said supernode device, when said timer has elapsed; and wherein, when said supernode device detects at least one second floor request with higher priority before expiry of said timer, said supernode device is further configured for:

releasing the buffer; and notifying said terminal device that the terminal device is refused floor control.

17. A supernode device configured for managing floor control on a shared communication channel in the context of half-duplex communications implemented in a communication network composed of a plurality of interconnected sub-networks, each sub-network being associated with a supernode device in the communication network, wherein, when a first floor request is received from a terminal device in a sub-network other than the one with which said supernode device is associated and said supernode device is not aware of at least one second floor request with higher priority, said supernode device comprising:

a machine or a dedicated component so that the supernode is in hardware form configured for, or a programmable machine and a memory storing a set of instructions so that the supernode is in software form configured by execution of the set of instruction by the programmable machine for:

transmitting a floor pre-grant notification message to each terminal device in the sub-network with which the supernode device is associated, so that each terminal device in said sub-network listens to the shared communication channel;

determining the duration of the timer according to a distribution law $f_\tau(t)$ for time period between a floor release and the next floor control, and a distribution law $f_\delta(d)$ for network latency between an instant at which a floor request is transmitted by a terminal device and an instant at which said request is actually received by said supernode device, so that the probability $P_{fail}$ of dismissing said terminal device of the floor control is below a predefined threshold;

storing in a buffer data propagated by another supernode device in the context of floor control;

activating the buffer in read mode for broadcasting the stored data to each terminal device being listening on the sub-network associated with said supernode device, when said timer has elapsed; and wherein, when said supernode device detects at least one second floor request with higher priority before expiry of said timer, said supernode device is further configured for releasing the buffer.

* * * * *